United States Patent [19]
Ogawa et al.

[11] Patent Number: 5,802,065
[45] Date of Patent: Sep. 1, 1998

[54] DATA RECEIVING DEVICE

[75] Inventors: Tetsuo Ogawa, Kunitachi; Hiroshi Satoh, Suginami, both of Japan

[73] Assignee: Kawasaki Steel Corporation, Kobe, Japan

[21] Appl. No.: 734,777

[22] Filed: Oct. 22, 1996

[30] Foreign Application Priority Data

Oct. 23, 1995 [JP] Japan .................. 7-274029

[51] Int. Cl.$^6$ .................................................. H04J 3/22
[52] U.S. Cl. .................................. 370/469; 370/394
[58] Field of Search ............................. 370/389, 392, 370/394, 395, 396, 397, 465, 466, 469, 471; 395/200; 375/202, 222

[56] References Cited

U.S. PATENT DOCUMENTS

| | | | |
|---|---|---|---|
| 4,931,250 | 6/1990 | Greszczuk | 375/8 |
| 5,379,297 | 1/1995 | Glover et al. | 370/234 |
| 5,425,051 | 6/1995 | Mahany | 375/202 |
| 5,528,592 | 6/1996 | Schibler et al. | 370/397 |
| 5,680,551 | 10/1997 | Marino, II | 395/200 |

*Primary Examiner*—Hassan Kizou
*Assistant Examiner*—A. Bnimoussa
*Attorney, Agent, or Firm*—Oliff & Berridge

[57] ABSTRACT

A sequencer 32 is provided with a plurality of protocol processing circuits for independently carrying out at least a part of processes to respective protocol hierarchies of the protocol in response to sequence selection by a sequence selection circuit 28 according to a result of received protocol type identification in a protocol recognition circuit 26. As a result, processes for the respective protocol hierarchies of the protocol or partial processes thereof can be simply and efficiently performed at the same time, and the data receiving device can be configured by the hardware.

11 Claims, 30 Drawing Sheets

FIG.6

| TRANSPORT LAYER PROTOCOL | SOURCE IP ADDRESS <31:0> | DESTINATION IP ADDRESS <31:0> | DESTINATION PORT NUMBER |
|---|---|---|---|

DATA RECEIVING DEVICE

BACKGROUND OF THE INVENTION

1. Field of the Invention

The present invention relates to a data receiving device that receives from a network frame data based on any arbitrary protocol of a plurality of protocol hierarchies defined from a physical layer to upper layers, and more particularly to a data receiving device which is capable of simply and efficiently enabling simultaneous execution of processes and partial processes of a plurality of the protocol hierarchies determining the protocol of the received frame data and which can easily and comprehensively configure apparatuses carrying out these processes using hardware.

2. Prior Art

A telephone network constructed to achieve interactive communication using voice, such as a telephone net, for example, a telephone type public communication line and others or a specific communication line has a limitation in transfer quality or transfer rate when used in data communication. Construction of a digital data public network that is more suitable for characteristics inherent to data communication, e.g., data traffic characteristics has been advanced in all the countries of the world including Japan. This digital data public network uses transmission paths and exchanges for digital signals and, in Japan, services on line switching networks or packet switching networks are provided. In addition, in regard of international connection, international standardization has been enhanced by CCITT (International Telegraph and Telephone Consultative Committee) and currently prepared as recommendations (X-series recommendations) relative to new data networks such as a line switching system, a packet switching system, digital private lines and others.

Meanwhile, networks referred to as LANs (Local Area Networks) have been widely used for the purpose of sharing information (data) in, e.g., data bases or peripheral devices. Such a LAN connects digital devices such as computers, communication terminal devices and others dispersed and provided in a predetermined local area such as an office, a factory or a laboratory or in a limited space such as a campus, and has a kind of exchanging function. In such a LAN, standardization of protocols and others has been carried out by IEEE (Institute of Electrical Electronics Engineers) 802 committee or ISO (International Standardization Organization).

An OSI (Open Systems Interconnection) reference model adopted in the digital data public network or a protocol for the above-mentioned LAN standardized by IEEE are defined by a plurality of protocol hierarchies each of which is determined from the physical layer to upper layers. Also, protocols widely used in WANs (Wide Area Networks) or any other LANs are usually defined in accordance with a plurality of protocol hierarchies. In s this way, almost all the network protocols are defined according to a plurality of protocol hierarchies.

In addition, connection between a plurality of networks, e.g., LANs, WANs or digital data public networks has been conventionally achieved. For example, such internetwork connection has been attained even between networks having some of multiple protocol hierarchies defining the protocol for transmitting messages different from each other.

Here, an internetwork repeater by which two networks having the same MAC (Media Access Control) layer in the second layer of OSI are connected in the second layer is called a bridge or the like. An internetwork repeater for connecting a plurality of networks having different first through seventh layers of OSI is called a gateway or the like. Further, an internetwork repeater for connecting a plurality of networks having different first to third layers of OSI, are connected in the third layer such as one described later in this specification is called a router or the like.

Note that the data receiving device that is an object of the present invention is not restricted to a router such as an IP (Internet Protocol) router and others, but is applicable to the internetwork repeater such as the above-mentioned bridge or gateway. In addition, the data receiving device according to the present invention is not limited to such an internetwork repeater, and it may be a device for receiving any frame data from networks. The network connected by the data receiving device to which the present invention is applied is not likewise limited to the above-described specific LAN, but it may be various kinds of LAN or WAN or digital data public network.

Here, in the data receiving device including the internetwork repeater such as the aforesaid bridge, gateway or router, the frame data input from the network is subjected to the following processes.

Process A1 for Identifying Protocols:

This process identifies types of parameters indicating a protocol type in a header defined by each protocol hierarchy in the order from the lower protocol hierarchy, i.e., the physical layer.

Process A2 for Analyzing Header

In accordance with a result of identification of the protocol, this process finds parameters concerning protocol information contained in the header and determines a process to be carried out with respect to the received frame. In particular, parameters such as a frame length, a header length, communication quality, a source address or a destination address, specification of a transmission path for the frame data (the transmission path is specified only in the internetwork repeater) are found and appropriate processes to be performed with respect to the received frame data are determined based on the found parameters.

Process A3 for Verifying Header Frame:

The process for controlling errors relating to the protocol information included in the header is executed. For example, a checksum included in the header is used to verify validity of the header or the frame data.

Note that the following processes are performed in addition to the above processes A1 to A3 when the data receiving device is the internetwork repeater.

Process A4 for Determining Destination:

Based on the protocol information included in the header, a destination to which the received frame data is transmitted is determined and that frame data is actually transmitted. In particular, a destination to which the received frame data is sent is determined based on a source address or a destination address, or information (data) specifying the transmission path for transmitting the frame data included in the header, and that frame data is actually transmitted.

The above processes are carried out in accordance with each protocol hierarchy of the received frame data and definition of each protocol hierarchy. Therefore, processes to be performed differ depending on each protocol and each protocol hierarchy constituting the protocol. Some protocol hierarchies may have a header containing an optional field whose existence or length is indefinite and, in such a case, processes for the s header may differ depending on each protocol hierarchy because the header length is not fixed even in the same protocol hierarchy. Thus, in the prior art, processes for the frame data received by the data receiving device have been generally carried out using flexible software.

However, the operation for advancing such processes executed in the data receiving device starting from the lower protocol hierarchy, i.e., the physical layer while confirming the protocol information (parameters) in each header has a large throughput and requires large CPU (Central Processing Unit) power, bottlenecking the processes in the data receiving device. Since the property of real time is basically required for the processes executed in the data receiving device, such problems are becoming serious as the processing speed in a target network is increased. For example, in case of the internetwork repeater determining a recent network having a high processing speed as a target in particular, if the process for linking one network to another network is delayed, the communication speed inherent to the network itself is decreased and the high processing speed can not be fully used, resulting in the drawback which must be urgently solved.

In order to shorten the processing time in the data receiving device, use of a further high performance CPU can be considered. However, there is a limit in shortening the processing time even if the high performance CPU is used. Further, processes in the conventional data receiving device are hard to be realized by hardware or hard to be executed by parallel processing using a plurality of CPUS.

SUMMARY OF THE INVENTION

In view of the above-described drawbacks, it is an object of the present invention to simply and efficiently enable simultaneous execution of processes of a plurality of protocol hierarchies determining a protocol of received frame data or partial processes thereof and to enable a device for carrying out these processes to be easily and extensively configured using hardware.

In a data receiving device for receiving from a network frame data based on any arbitrary protocol of a plurality of protocol hierarchies defined from a physical layer to upper layers, the present invention solves the above-described drawbacks by comprising: an input data control circuit for receiving the frame data together with its synchronizing signals from the network and holding them in a register; a capture register circuit for storing/holding in accordance with information such as a protocol type code, a header length, a frame length (network layer only), source/destination addresses or source/destination port or socket numbers included in a header for each protocol hierarchy constituting the frame data; a protocol recognition circuit for identifying a protocol type of each protocol hierarchy from the protocol type code stored in the capture register circuit; a sequence selection circuit which generates a sequence selection signal for selecting a processing for each protocol hierarchy of the received frame data in accordance with a result of identification by the protocol recognition circuit and changing the sequence selection signal in accordance with a header end signal; a sequence counter for counting a pulse signal in the frame data synchronizing signal; a sequencer which operates in response to a value of the sequence counter and the sequence selection signal and has a function for directing the capture register circuit a timing for storing/holding information included in the header for each protocol hierarchy and for outputting a second header end timing used to direct an end timing for the header when a protocol that is specified by the sequence selection signal and being processed has a header with a fixed length; and a header end timing detection circuit for selecting either a first header end timing obtained by comparing a value of the sequence counter with the header length of the protocol hierarchy which is being received and the second header end timing output by the sequencer to generate the header end signal.

Further, the input data control circuit includes a plurality of registers which are connected with each other in the form of a shift register and operate as a pipeline, and has a function for inputting the frame data to a first step of the registers using the frame data synchronizing signal to output a content of each register to the capture register circuit.

Furthermore, if there is provided a frame end detection circuit which counts a pulse signal in the frame data synchronizing signal and generates a signal indicating an end timing for the frame data that is being received by comparing a value of the counter with the frame length after initialized by a frame counter initializing signal output from the sequencer, the process for detecting the end timing for the frame data that is usually required in a general data receiving device can be independently executed simultaneously with any other process, thereby improving the throughput.

Moreover, if there is provided an interrupt generation circuit for generating an interrupt signal to an external circuit when a header end signal produced by the header end timing detection circuit or a frame end signal generated by the frame end detection circuit is input, processes in an external circuit, e.g., a computer or the like, using information based on the frame data output from the data receiving device can be readily executed. In an external computer or the like, the structure of its software can be further simplified to improve the throughput by starting the process executed in response to an end of the header or that executed in response to an end of the frame data by the interrupt signal from the interrupt generation circuit.

In addition, if the input data control circuit includes a first cut-through circuit for outputting the frame data synchronizing signal outside according a direction of a first cut-through signal output from the sequencer and for outputting outside a content of a specific register in the input data control circuit according to the first cut-through signal in synchronism with the frame data synchronizing signal, source/destination addresses and others included in the header of each protocol hierarchy of the received data frame can be selectively fetched and output to external circuits. Therefore, information required in a destination of linking to which the received data frame is transmitted or for the repeating process can be fetched at high speed by using a retrieval table formed by a CAM (Contents Addressable Memory), a RAM (Random Access Memory) and others in an external circuit and executing table retrieval using the output as key data for retrieval.

Also, when the capture register circuit includes a second cut-through circuit for outputting outside a content of a specific register in the capture register circuit together with the corresponding synchronizing signal in response to a direction of the second cut-through signal output from the sequencer, source/destination addresses and other information included in the header of each protocol hierarchy of the received data frame can be selectively fetched and output to an external circuit. Therefore, information required in a destination of linking to which the received data frame is sent or for the repeating process can be fetched at high speed by using the retrieval table constituted by the CAM, the RAM and others in the external circuit and executing table retrieval using the output as key data for retrieval. Furthermore, when source/destination addresses, port numbers, socket numbers or protocol codes included in the headers of a plurality of protocol hierarchies are combined to create key data for retrieval and table retrieval is executed, the process required for the V-LAN (Virtual LAN) or the so-called "Firewall" to enhance security by restricting access to information can be executed at extremely-high speed, as well as the process in the bridge or the router.

In addition, if there is provided a cut-through selection circuit for selecting and outputting one of signals output from the first cut-through circuit and the second cut-through circuit, a cut-through system can be selected.

Further, if the input data control circuit has a configuration for taking out a destination address from the header in the protocol hierarchy for the received data and transmitting it to an external circuit, it is possible to readily cope with a multi-protocol system.

Furthermore, if information stored and/or held in the capture register circuit or a protocol of each protocol hierarchy identified by the protocol recognition circuit can be read out to an external circuit, various functions can be realized.

Moreover, if the input data control circuit has a function for verifying a checksum with respect to the received data frame and a function for transmitting a result of verification to an external circuit and the sequencer has a function for directing a timing at which the checksum operation is started and a timing at which results of the checksum operation are compared with each other to the input data control circuit, data can be verified with the simple configuration.

According to the present invention, processes for a plurality of protocol hierarchies for defining a protocol for the received frame data or partial processes thereof can be simply and efficiently carried out at the same time. Additionally, the data receiving device for effecting these processes can be easily and comprehensively constructed using the hardware.

BRIEF DESCRIPTION OF THE DRAWINGS

FIG. 6 is a diagram showing a configuration example of a firewall table;

DESCRIPTION OF THE PREFERRED EMBODIMENTS

Figure 1:
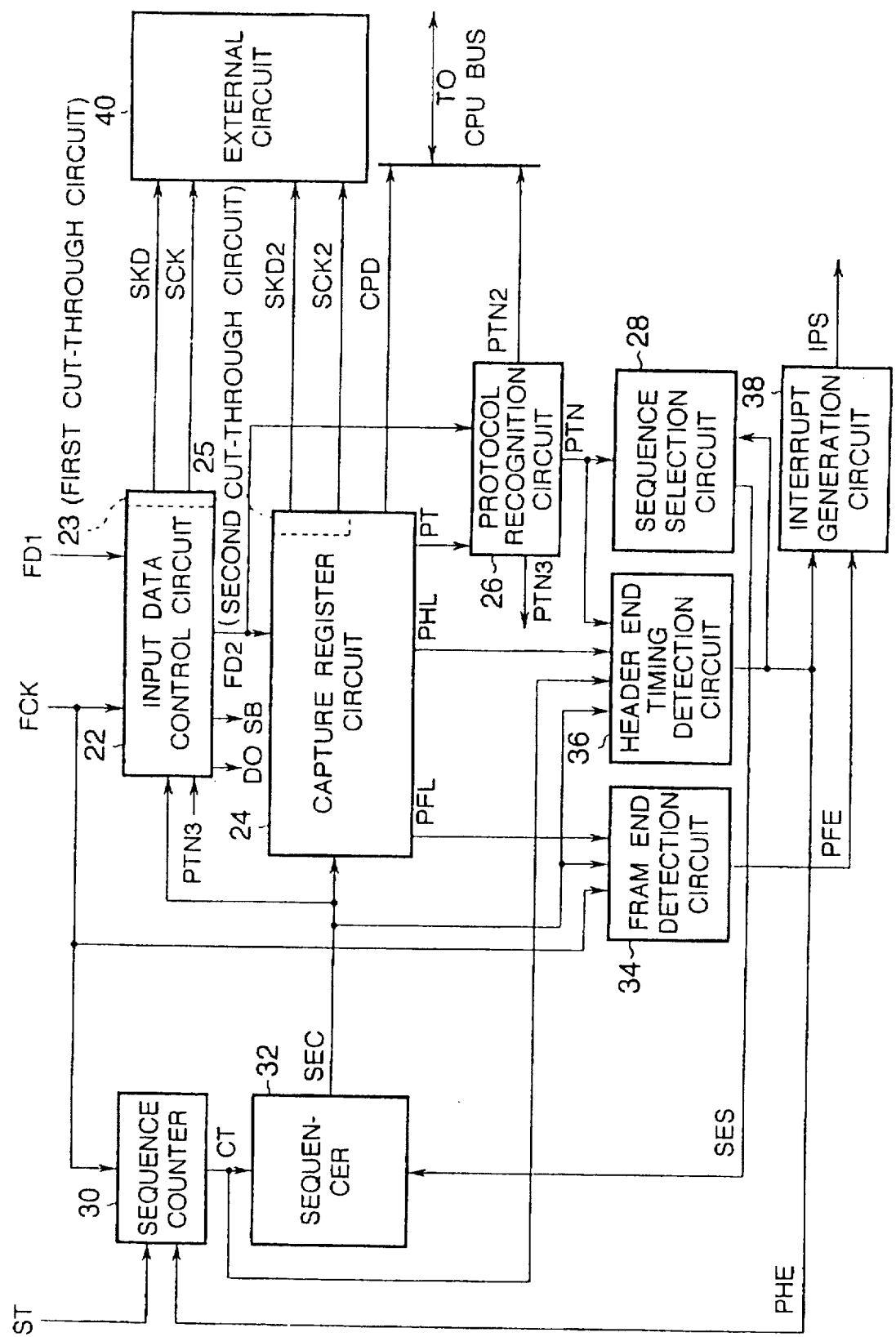
FIG. 1 is a block diagram showing the structure of a first embodiment of a data receiving device according to the present invention.

Preferred embodiments according to the present invention will now be described in detail hereunder with reference to the accompanying drawings. is FIG. 1 is a block diagram showing the structure of a data receiving device of a first embodiment to which the present invention is applied.

Figure 2:
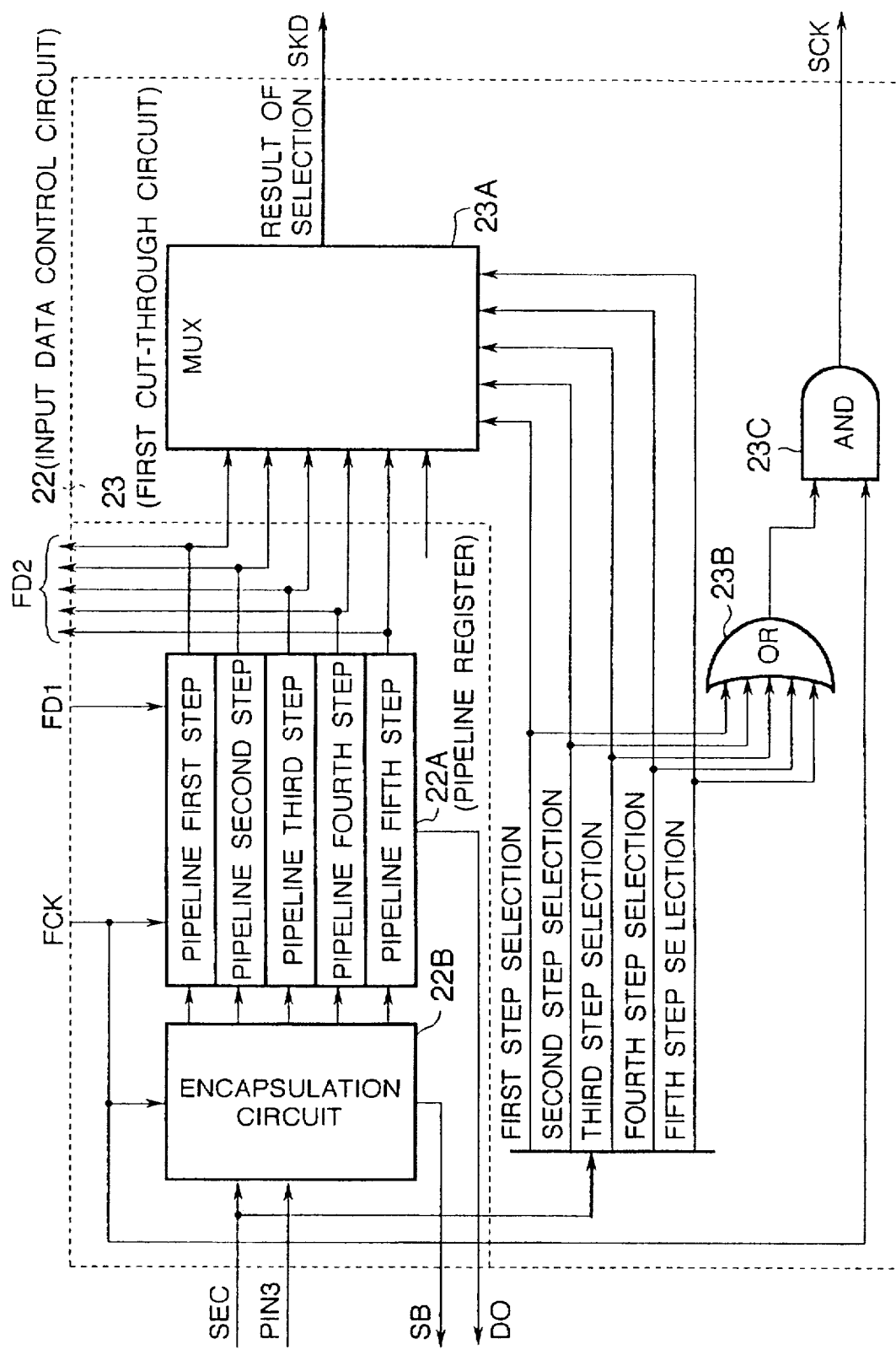
FIG. 2 is a block diagram showing the structure of an input data control circuit used in the first embodiment.
Figure 3:
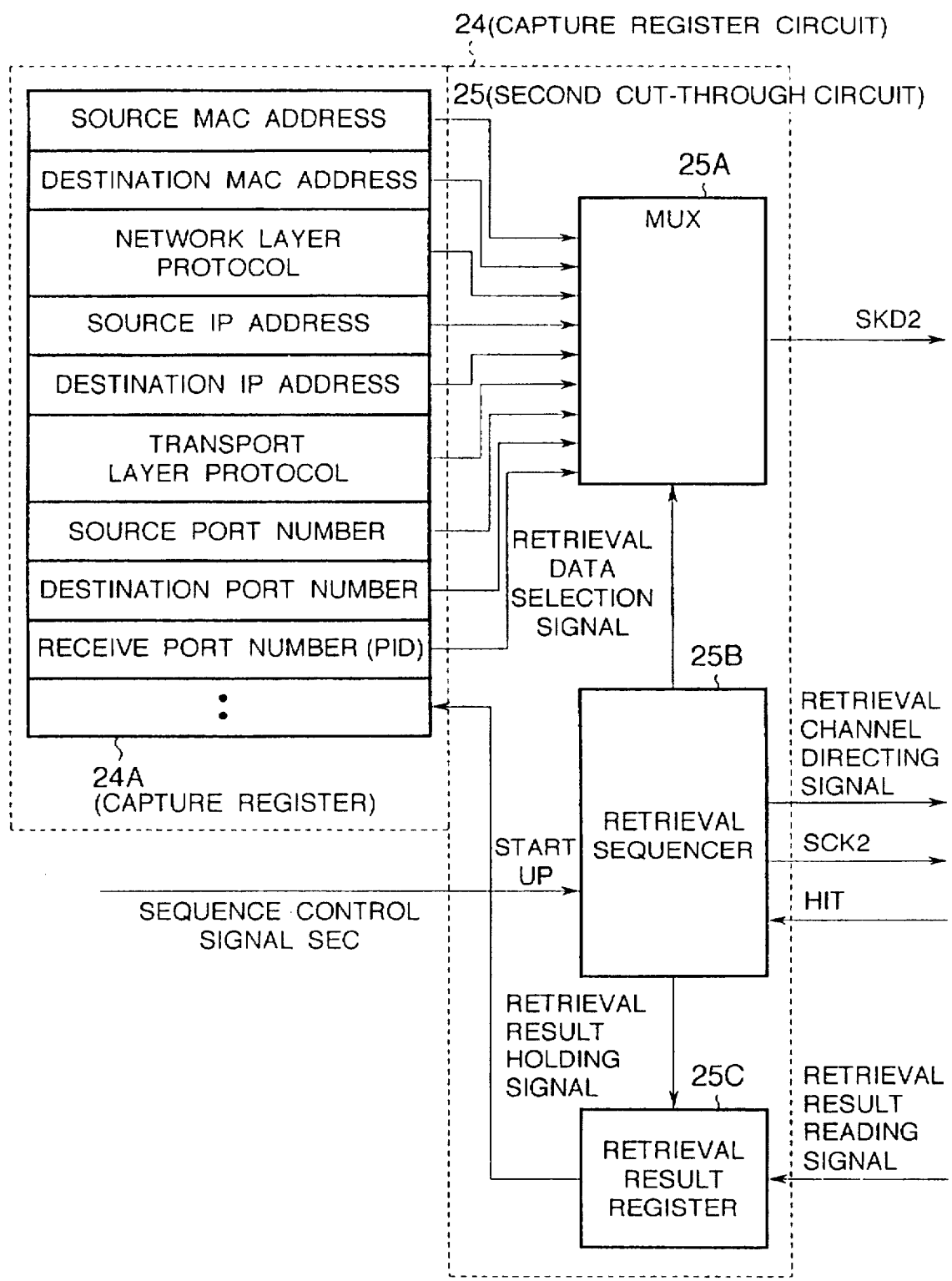
FIG. 3 is a block diagram showing the structure of a capture register circuit.

As shown in FIG. 1, the first embodiment basically comprises: an input data control circuit 22; a capture register circuit 24; a protocol recognition circuit 26; a sequence selection circuit 28; a sequence counter 30; a sequencer 32; and a header end timing detection circuit 36. The present invention further comprises a frame end detection circuit 34 and an interrupt generation circuit 38 in this embodiment, but the invention is not restricted to this structure for application. Various modes of the above-mentioned components can be considered, and a first cut-through circuit 23 may be provided to an output side of a pipeline register (which will be simply referred to as a pipeline hereunder) constituting the input data control circuit 22 as shown in FIG. 2, or a second cut-through circuit 25 may be also provided to an output side of the capture register 24A constituting the capture register circuit 24 as shown in FIG. 3. In FIG. 2, reference character 23A denotes a multiplexer (MUX); 23B, an OR gate; and 23C, an AND gate.

The input data control circuit 22 receives frame data FD1 having a width of, e.g., 16 bits transmitted from outside of the data receiving device in synchronism with a frame data synchronizing signal FCK which is also fed from outside.

Figure 4:
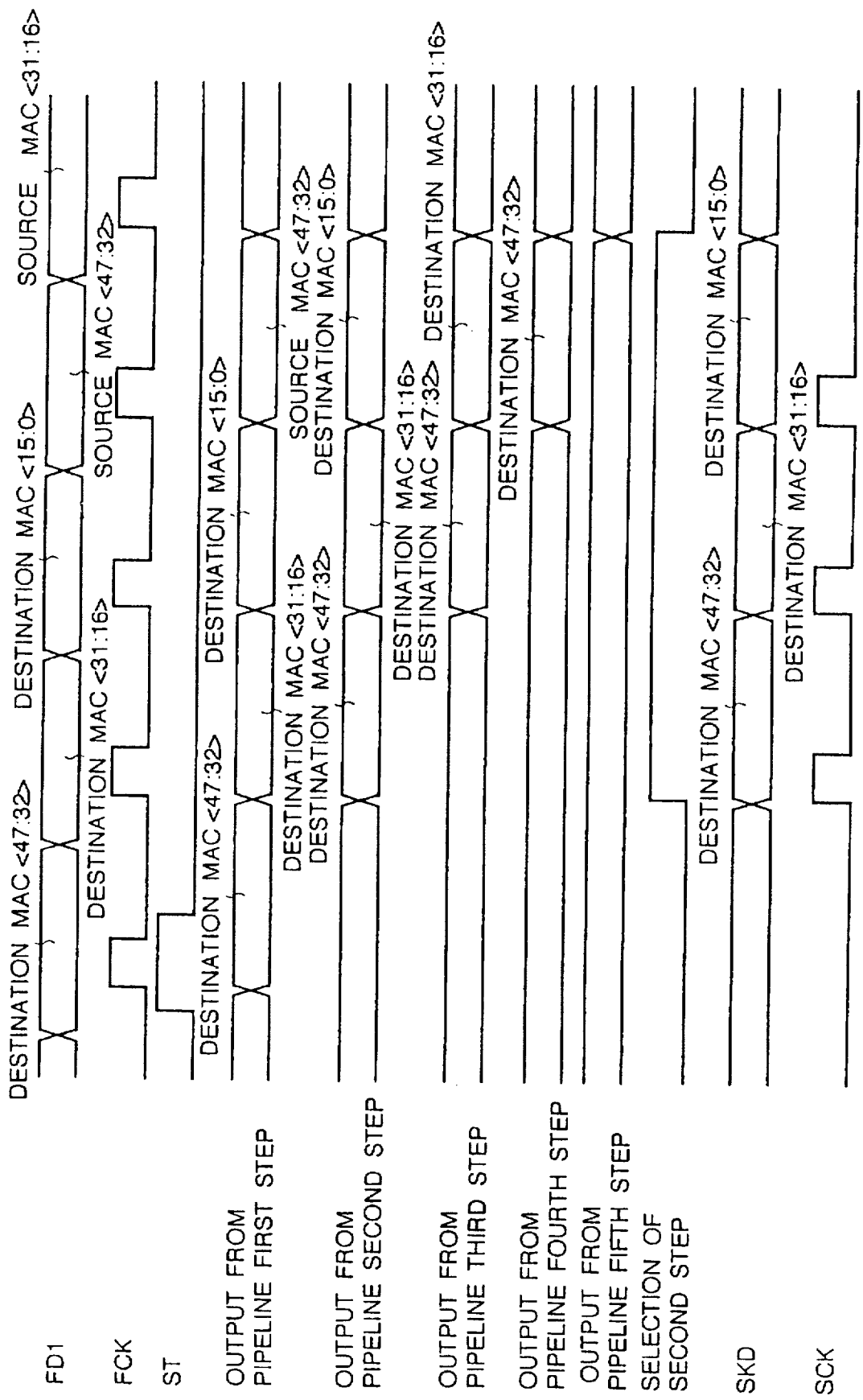
FIG. 4 is a timing chart showing the operation of the input data control circuit.

The input data control circuit 22 mainly characterized by the present invention in that, as shown in FIG. 2, the input data control circuit 22 has the pipeline 22A consisting of, e.g., five registers connected like a shift register and an encapsulation circuit 22B which generates encapsulated data based on a protocol identification code signal PTN3 output from the protocol recognition circuit 26 and supplies the obtained data to each step of the pipeline 22A, and the input frame data passes through the pipeline 22A in synchronism with the frame data synchronizing signal FCK as shown in FIG. 4. Outputs FD2 from each step of the pipeline 22A are connected with an input of the capture register circuit 24. Further, an output from a last step register in the input data control circuit 22 is output to an external circuit as an output frame data signal DO, and the encapsulated frame data can be output by partially rewriting data of the received data frame in the input data control circuit 22.

Figure 5:
FIG. 5 is a diagram showing an configuration example of a retrieval table in a CAM of an external circuit connected with the first embodiment.

The input data control circuit 22 further includes a first cut-through circuit 23, and the output from each step of the pipeline 22A is output to an external circuit 40 such as a computer, an SRAM or a CAM as a retrieval key data signal SKD. The frame data synchronizing signal FCK is also output to the external circuit 40 as an retrieval data synchronizing signal SCK in response to a direction from the later-described sequencer 32. These retrieval key data signal SKD and retrieval data synchronizing signal SCK are used to output a destination address for the received data to the external circuit 40 for carrying out various processes outside. For example, if the data receiving device according to the present embodiment is a bridge for relaying the data frame which is transmitted from one host computer in a network to another computer in the same network, the destination MAC address is output to the retrieval key data signal SKD. Moreover, if a CAM having a retrieval table consisting of an eight-bit PID field representing a port number to be relayed, a 48-bit MAC address field and a 32-bit IP address field as shown in FIG. 5 is used as the external circuit 40, an entry having a value equal to that of the retrieval key data signal SKD output in the MAC address field can be found in each entry of the retrieval table by retrieving in the MAC address field with the retrieval key data signal SKD as retrieval key data, and a PID (port ID), with which the host computer that is to receive the data frame is connected, can be obtained by reading that entry.

As shown in FIG. 3, the capture register circuit 24 is constituted by a plurality of capture registers 24A for a source MAC address, a destination MAC address, a network layer protocol, a source IP address, a destination IP address, a transport layer protocol, a source port number, a destination port number, receive port number (PID) and others. Although the present invention is not restricted to this structure in application, this embodiment has a source MAC register for storing/holding a source MAC address, a destination MAC register for storing/holding a destination MAC address and a network layer protocol register for storing/holding a network layer protocol as registers for storing/holding information included in the MAC layer header; a frame length register (network layer only) for storing/holding a frame length, a transport layer protocol register for storing/holding a protocol code of a transport layer, a source network address register for storing/holding a source network address, a destination network address register for storing/holding a destination network address, and a header length register for storing/holding a length of the network layer header as registers for storing/holding information included in the network layer header; and a source port register for storing/holding a source port number and a destination port register for storing/holding a destination port number as registers for storing/holding information included in the transport layer header.

The capture register circuit 24 stores the output from the input data control circuit 22 in a predetermined register in accordance with a direction from a later-described sequencer 32. As a result, the protocol information (parameters) in a header of the received frame data can be assuredly stored in a register corresponding with the parameters in the capture register 24A while flexibly coping with each protocol type of the received frame data or a difference in protocol hierarchies. The external CPU can read out the stored parameters through the CPU bus.

The capture register circuit 24 further comprises a second cut-through circuit 25 as described above, and data stored/held by a predetermined register in the capture register 24A is output to the external circuit 40 such as a computer, an SRAM or a CAM as a retrieval key data signal SKD2 together with the synchronizing signal SCK2 relating to the retrieval key data signal SKD2.

S In the embodiment, a CAM is assumed as the external circuit 40, and input/output signals transmitted and/or received between the CAM and the second cut-through circuit 25 are a retrieval channel directing signal for directing the operation of the CAM, a HIT signal representing whether coincidence is detected as a result of retrieval using an output signal from the CAM and a retrieval result reading signal for reading a part of an entry with which coincidence is detected as a result of retrieval as well as the retrieval key data signal SKD2 and the synchronizing signal SCK2 relating thereto.

As shown in FIG. 3, the second cut-through circuit 25 comprises: an MUX 25A which receives the output from each register of the capture register 24A and selects and outputs any of the received outputs as SKD2 having a 32-bit width in accordance with a retrieval data selection signal output from a later-described retrieval sequencer 25B; a retrieval sequencer 25B which is started up by a control signal SEC from the sequencer 32, executes the retrieval operation with respect to the external CAM circuit by outputting the retrieval data selection signal and the SCK2, changes a sequence for retrieval using the HIT signal output from the CAM and directs a later-described retrieval result register 25C to store/hold a retrieval result reading signal by outputting a retrieval result holding signal; and a retrieval result register 25C which stores/holds the s retrieval result reading signal in response to the direction from the retrieval sequencer 25B and can be read by the external CPU as a part of the capture register circuit 24.

The retrieval key data signal SDK2 and the retrieval data synchronizing signal SCK2 are used to output a destination address of the received frame data to the external circuit 40 for executing various processes outside. For example, if the data receiving device of this embodiment is a bridge, the destination MAC address is output as the retrieval key data signal SKD2. On the other hand, if a CAM having the retrieval table configuration of which is shown in FIG. 5 is used as the external circuit 40, an entry having a value equal to that of the output retrieval key data signal SKD2 in the MAC address field can be found in each entry of the retrieval table by outputting the destination MAC address as the retrieval key data signal SKD2, and a PID with which a host computer which is to receive the data frame can be obtained by reading that entry. Further, by outputting the destination network address as the retrieval key data signal SKD2, an entry having the same value as the output retrieval key data signal SKD2 in the network address field can be found in each entry of the retrieval table, and it is possible to obtain a PID with which a host computer that is to receive the data frame and a MAC address of that computer by reading that entry. In addition, if a CAM having the retrieval table configuration of which is shown in FIG. 6 is used as the external circuit, judgment is made upon whether the data frame is to be relayed to enable the firewall to be constructed by outputting the transport layer protocol code, the transport layer port number, the source network address and the destination network address as the retrieval key data signal SKD2 and retrieving whether entries having the same data exist in the table. In this judgment, relay may be enabled if entries having the same data exist in the table, or it may be enabled if entries having the same data do not exist in the table.

Figure 7:
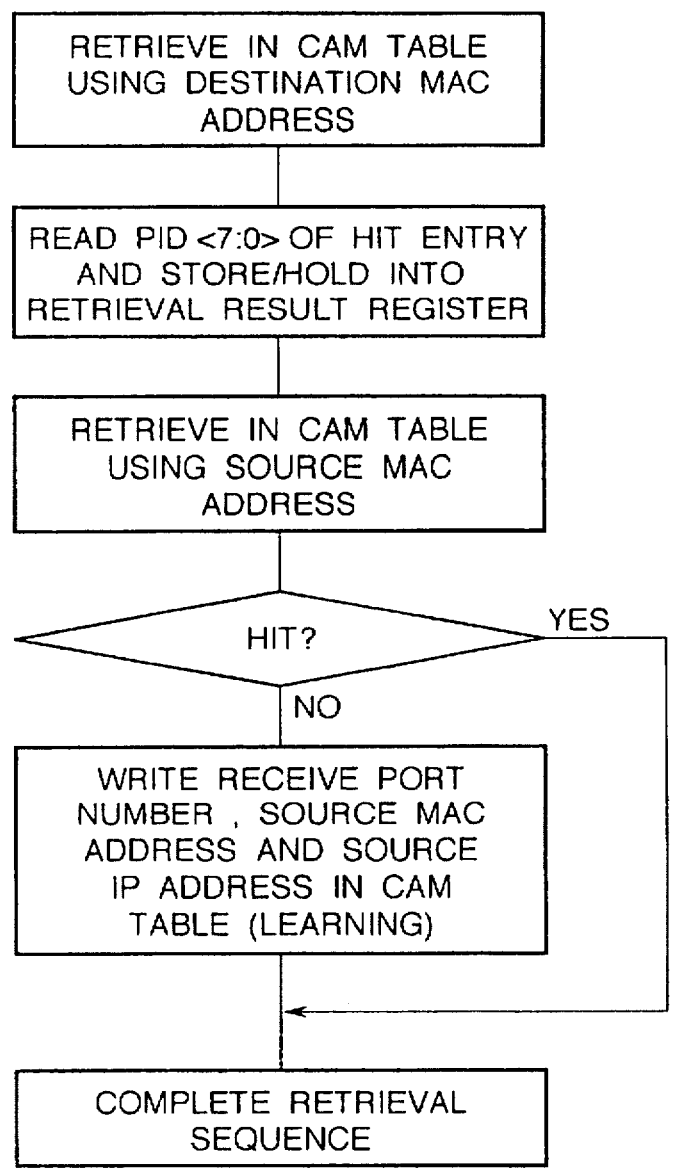
FIG. 7 is a flowchart showing an example of the retrieval operation executed by a second cut-through circuit in the capture register circuit in a bridge.
Figure 8:
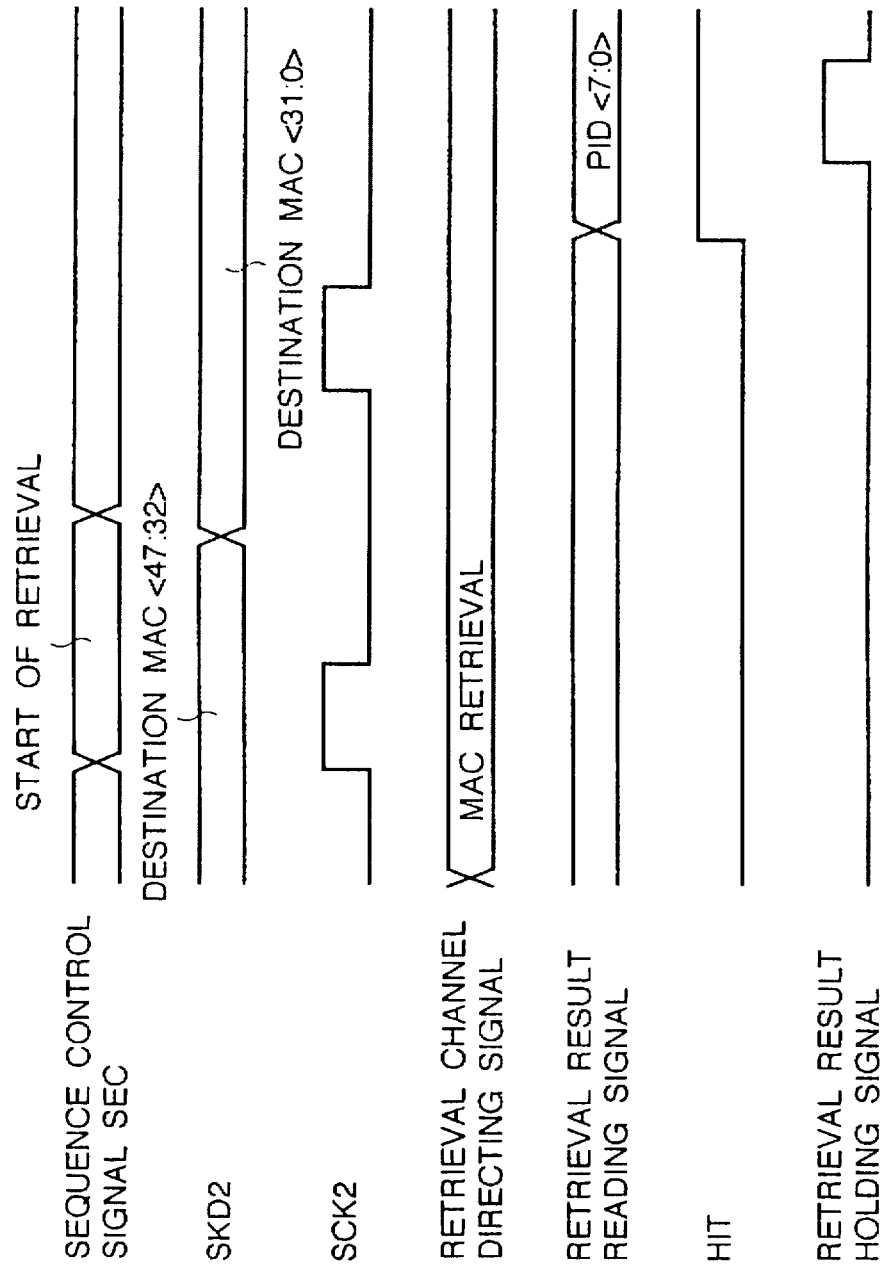
FIG. 8 is a timing chart partially showing an example of movement of each signal waveform in the retrieval operation illustrated in FIG. 7.
Figure 9:
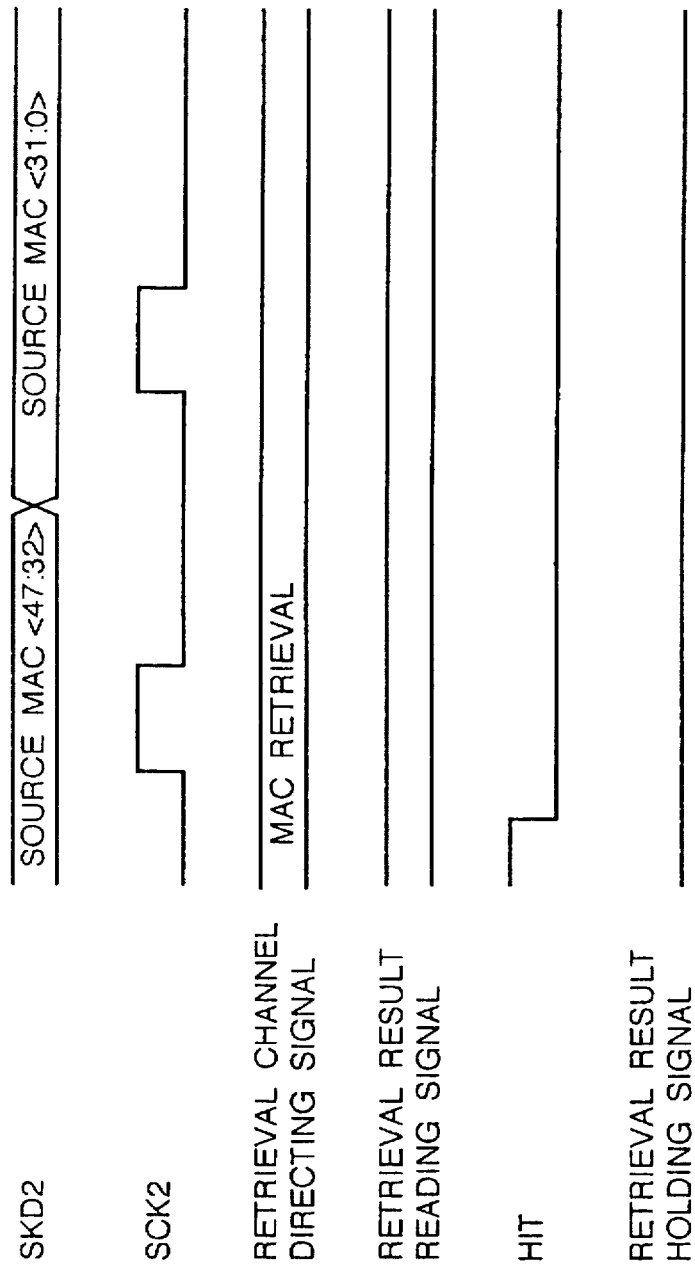
FIG. 9 is a timing chart continued from FIG. 8.
Figure 10:
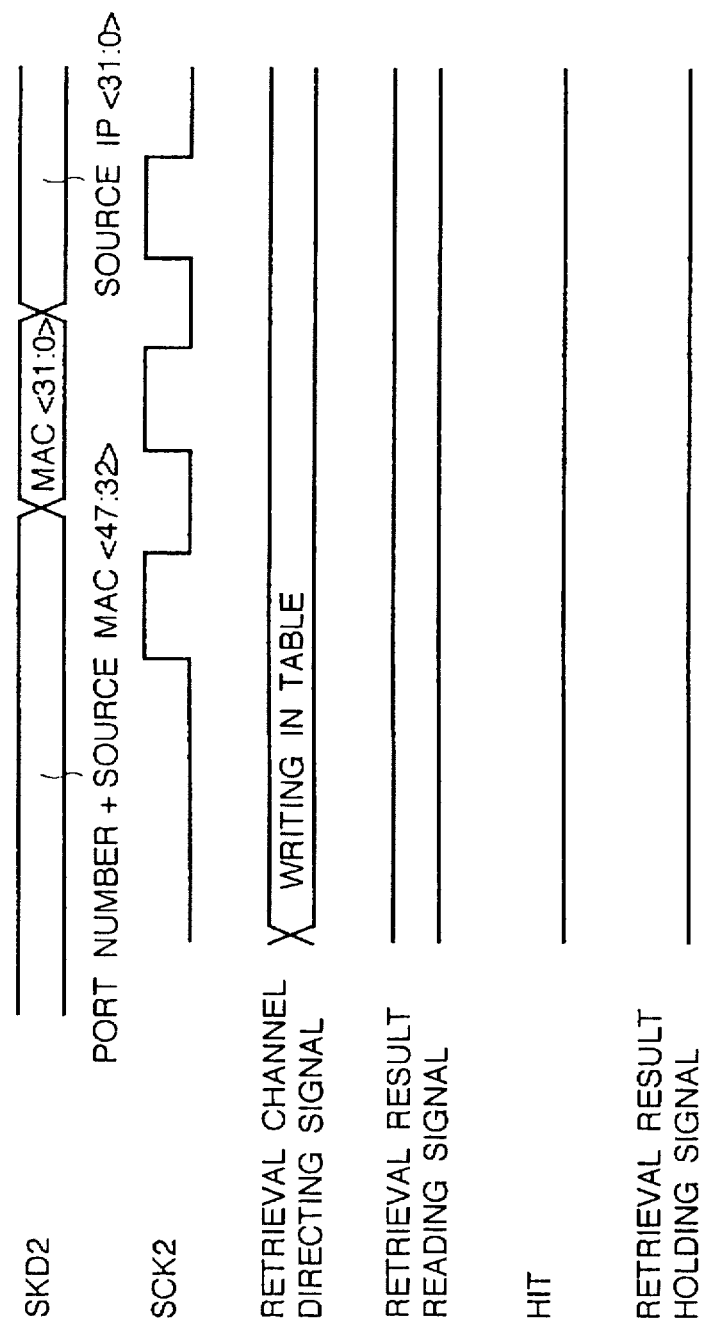
FIG. 10 is a timing chart continued from FIG. 9.

FIG. 7 shows an example of a series of retrieval operations carried out by the second cut-through circuit 25 in a bridge, and FIGS. 8 through 10 show the operation of each signal. FIGS. 8 to 10 divide the continuously-lapsed operation into three for the convenience's sake.

Figure 11:
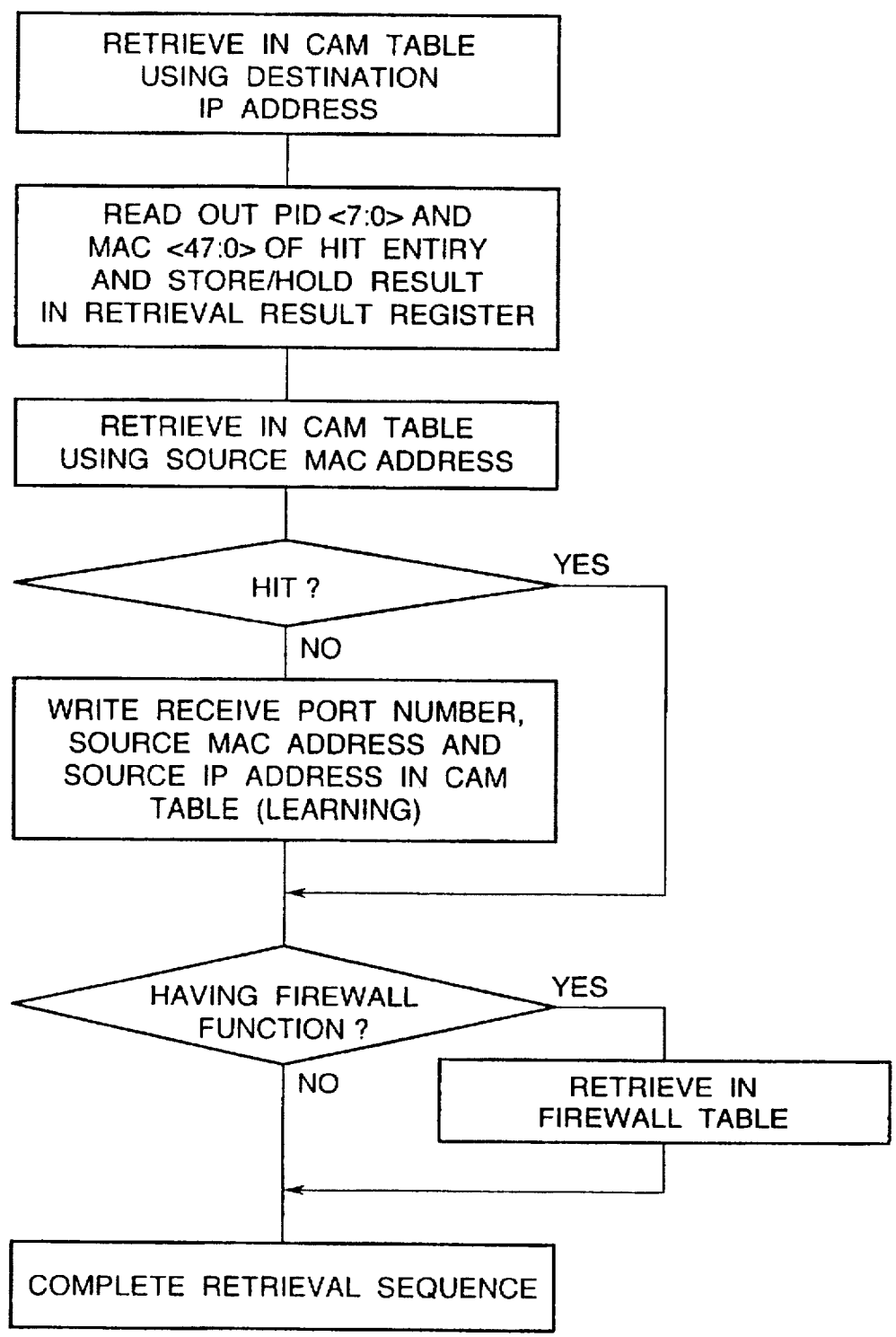
FIG. 11 is a flowchart showing an example of the retrieval operation executed by the second cut-through circuit in a router.
Figure 12:
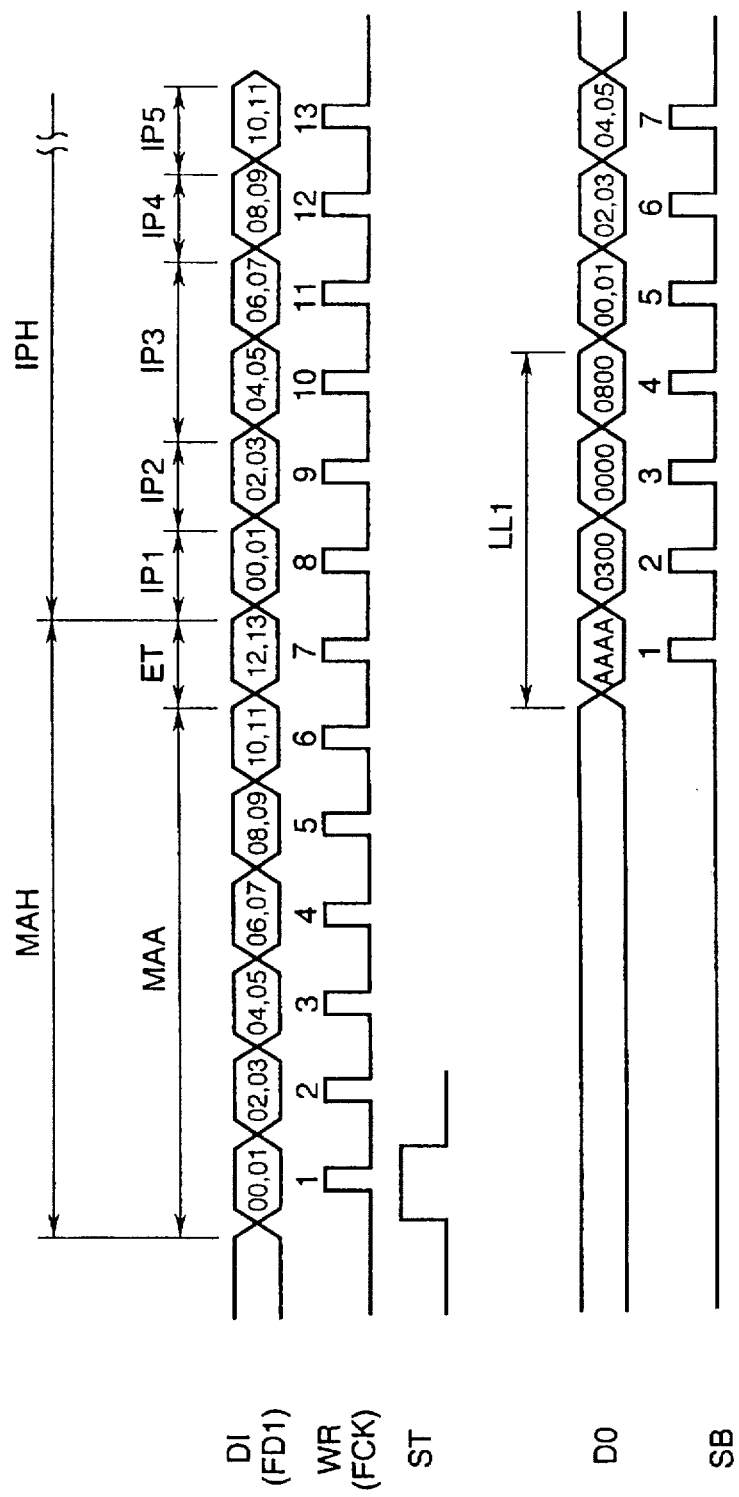
FIG. 12 is a timing chart showing the operation of the first embodiment when frame data of DIX-IP-TCP is received.
Figure 13:
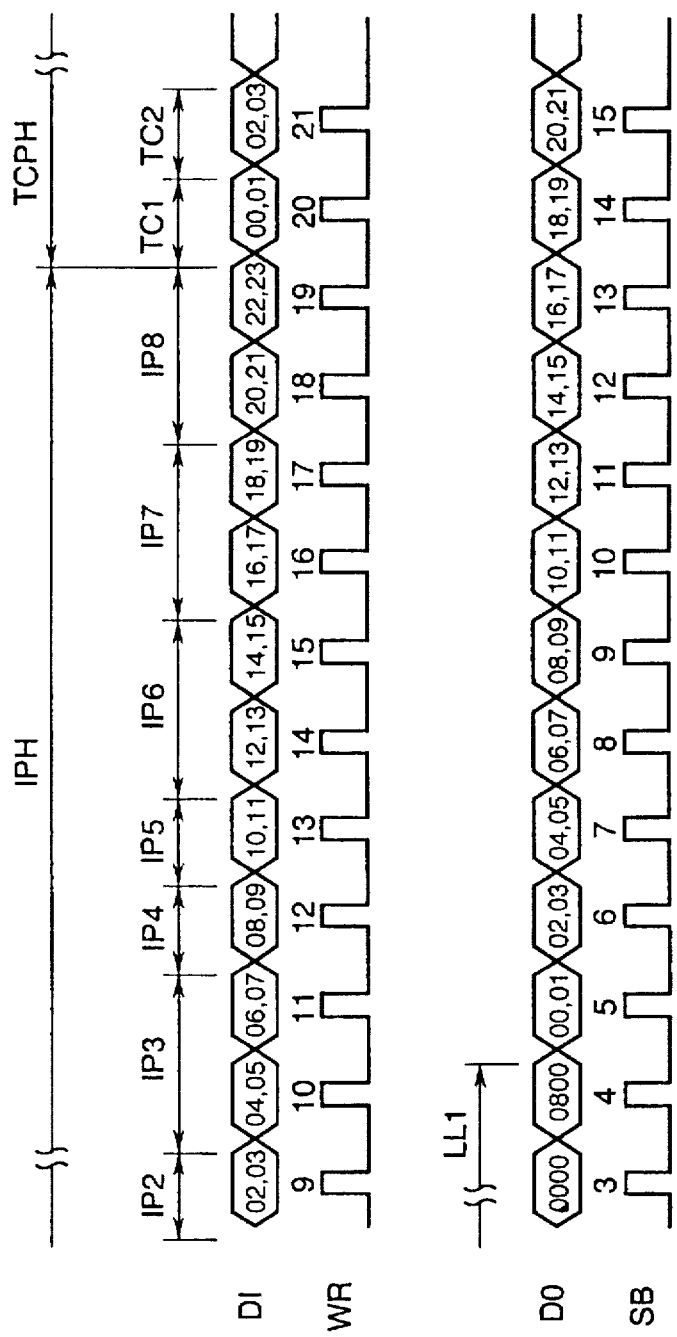
FIG. 13 is a timing chart continued from FIG. 12.
Figure 14:
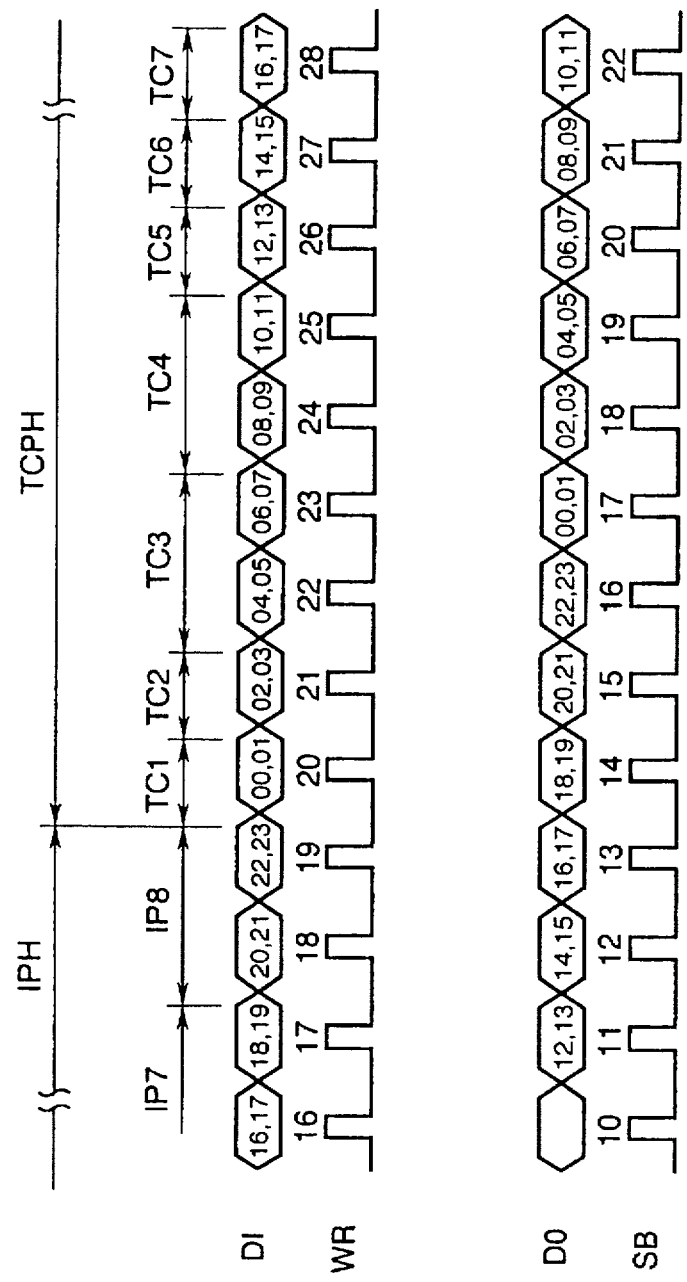
FIG. 14 is a timing chart continued from FIG. 13.
Figure 15:
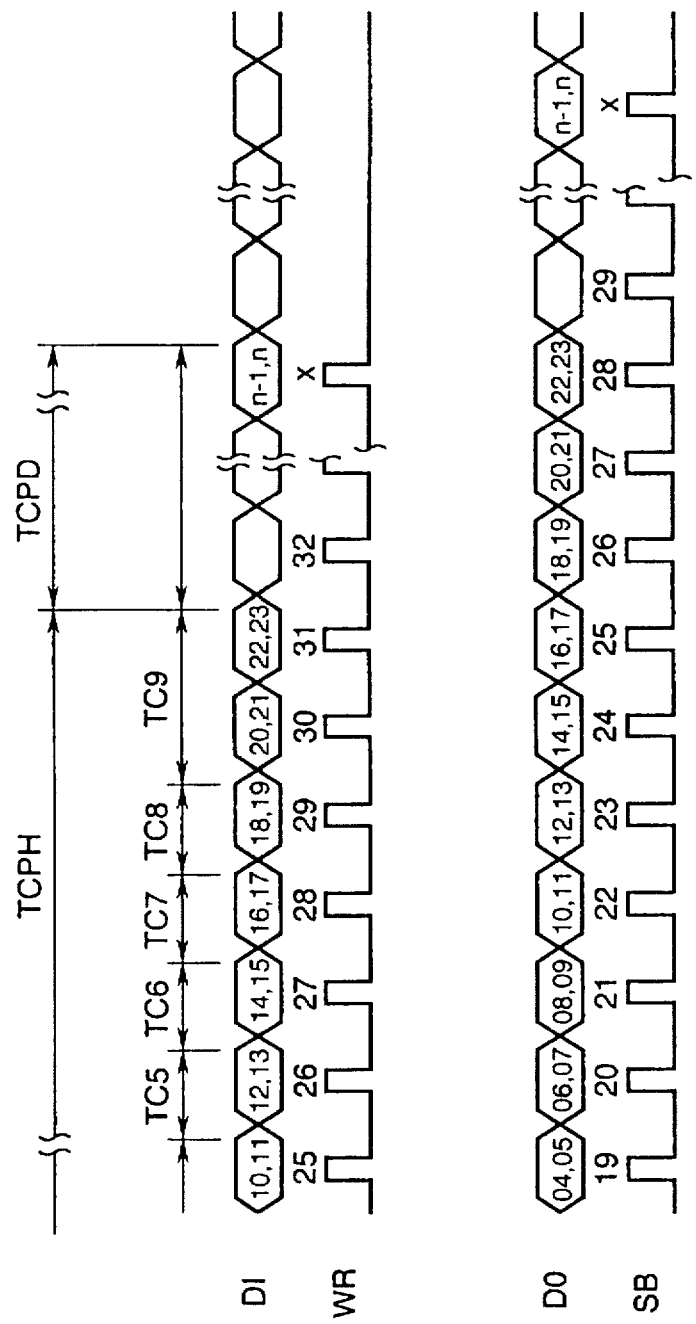
FIG. 15 is a timing chart continued from FIG. 14.
Figure 16:
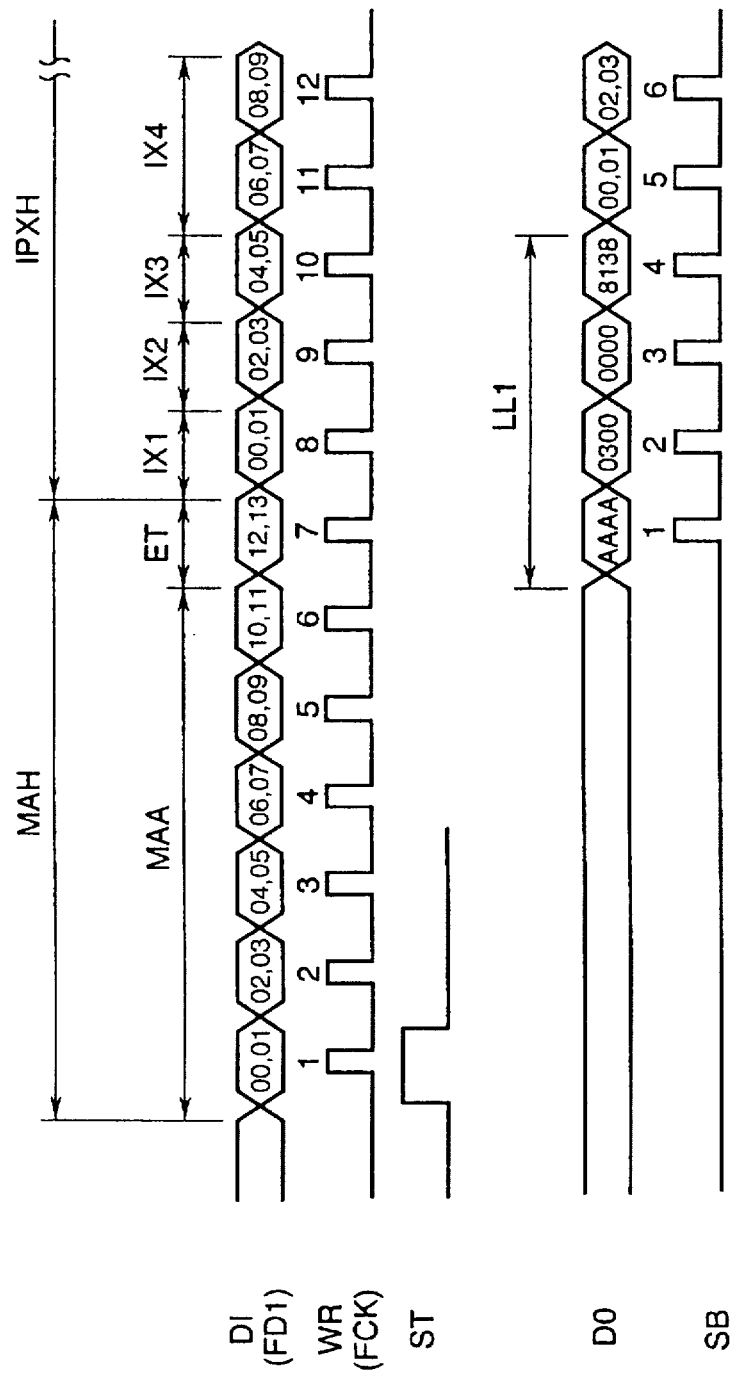
FIG. 16 is a timing chart showing the operation of the first embodiment when frame data of DIX-IPX-SPX is received.
Figure 17:
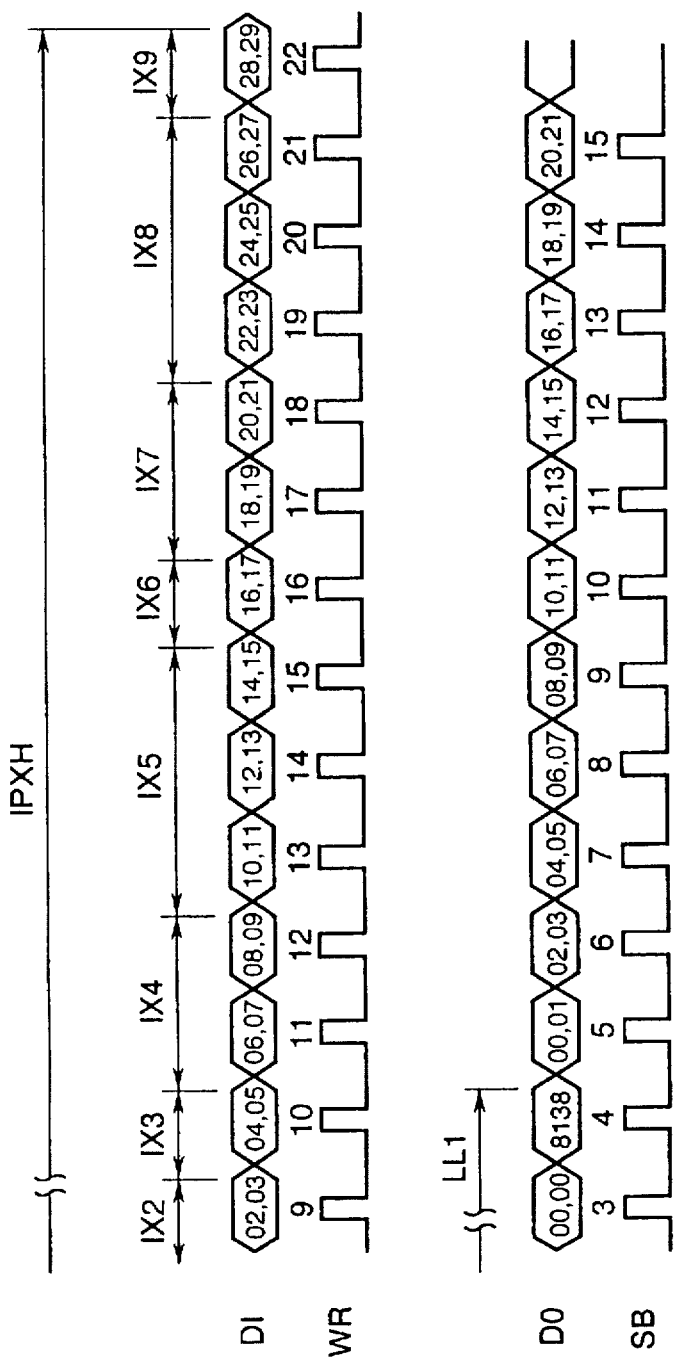
FIG. 17 is a timing chart continued from FIG. 16.
Figure 18:
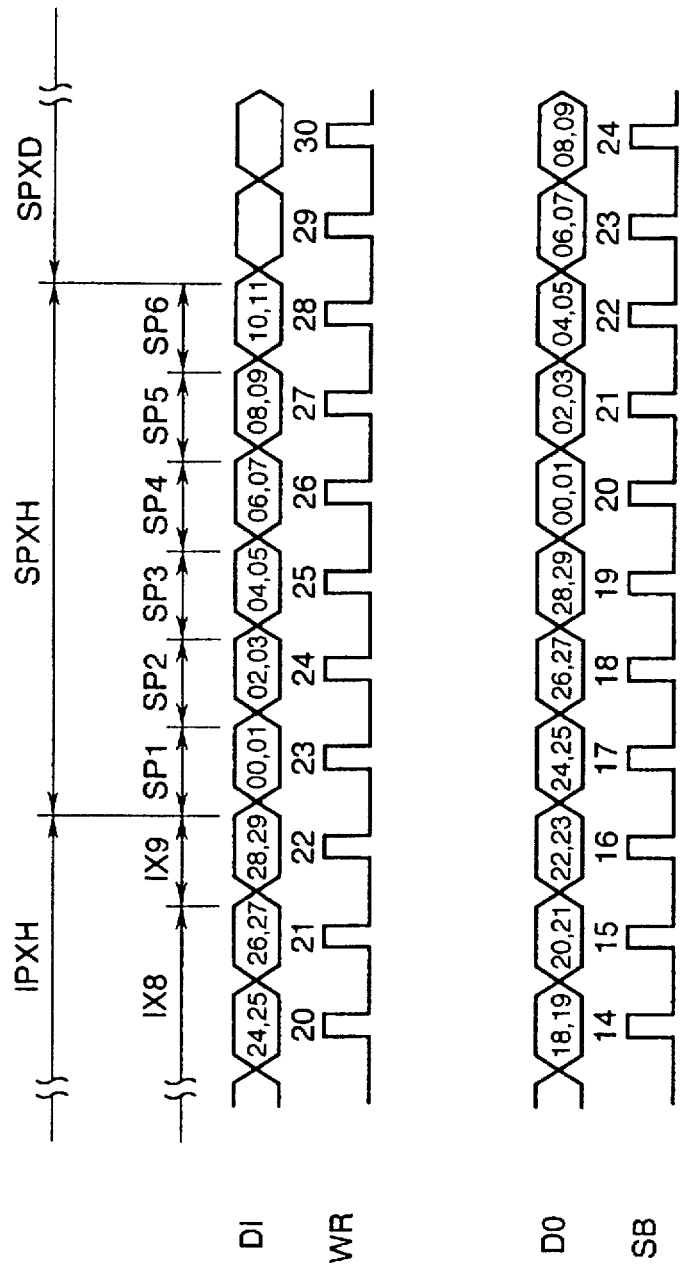
FIG. 18 is a timing chart continued from FIG. 17.

Also, FIG. 11 shows an example of a series of retrieval operations executed by the second cut-through circuit 25 in a router.

The protocol recognition circuit 26 identifies a protocol type of each protocol hierarchy by comparing a protocol type represented by a protocol type signal PT input from the capture register circuit 24 or a protocol type indicated by the frame data FD2 output from the input data control circuit 22 with a predetermined protocol code for checking coincidence.

Here, the frame data FD2 directly input from the input data control circuit 22 to the protocol recognition circuit 26 is only of a network layer protocol type included in the MAC layer header. A code signal indicating a type of any higher protocol hierarchy, which was temporarily stored in the capture register 24A, is input to the protocol recognition circuit 26. That is because the code representing the network layer protocol corresponds to the end of the MAC header and, if it is stored in the capture register 24A, it will not be ready for the network layer header processing.

Note that a result of recognition of a protocol type by the protocol recognition circuit 26 is output to the sequence selection circuit 28 or the header end timing detection circuit 36 as a protocol identification code signal PTN and also output to the external circuit such as a computer through the CPU bus as a protocol identification code signal PTN2.

The sequence selection circuit 28 generates a sequence selection signal SES for selecting a process for each protocol hierarchy of the received frame data based on a result of recognition of a protocol type output from the protocol recognition circuit 26 and changes the sequence selection signal SES corresponding with each protocol hierarchy in accordance with a header end signal PHE output from the header end timing detection circuit 36.

The sequence selection circuit 28 directs a sequence for the MAC to the sequencer 32 with respect to a process for the header of the MAC protocol hierarchy. When the header end timing detection circuit 36 detects an end timing for the header of the MAC protocol hierarchy, the sequence selection circuit 28 then directs a sequence corresponding with a protocol of the network protocol hierarchy to the sequencer 32. Similarly, the sequence selection circuit 28 directs a sequence corresponding with a protocol of the transport protocol hierarchy to the sequencer 32 at the end timing for the network protocol hierarchy.

The sequence counter 30 counts a pulse signal of the frame data synchronizing signal FCK input from outside. The sequence counter 30 is initialized by a sequence start signal ST indicating a start timing for the frame data input from outside and the header end signal PHE output by the header end timing detection circuit 36 and subjected to increment in synchronism with the frame data synchronizing signal FCK. The sequence counter 30 outputs a sequence counter signal CT representing a number of a word in a receiving header, to which the input data corresponds.

The sequencer 32 is provided with a plurality of processing sequences corresponding with various types of protocols of a plurality of protocol hierarchies, and selects one from a plurality of the processing sequences in accordance with a sequence selection signal SES output from the sequence selection circuit 28 and executes the selected sequence according to a sequence counter signal CT output from the sequence counter 30. The sequencer 32 directs a timing at which information of a protocol type code, a header length, source/destination addresses, source/destination port numbers and others included in the header of each protocol hierarchy is stored/held to the capture register circuit 24 by executing the selected sequence to output a sequence control signal SEC, and outputs a second header end timing indicating the end timing for the header if the currently-executed protocol possesses the header having a fixed length. Further, the sequencer 32 directs the input data control circuit 22 to output a value stored in a predetermined register within the circuit 22 as a retrieval key data signal SKD to the external circuit 40 together with the synchronizing signal SCK relative to the retrieval key data signal SKD by outputting the sequence control signal SEC.

Furthermore, by outputting the sequence control signal SEC, the sequencer 32 directs the capture register circuit 24 to output data stored/held by a predetermined register within the capture register 24A as a retrieval data signal SKD2 to the external circuit 40 together with the synchronizing signal SCK relative to the retrieval key data SKD2.

The header end timing detection circuit 36 selects either the first header end timing obtained by comparing a value of the sequence counter signal CT fed from the sequence counter 30 with a value (of a header length signal PHL) to be stored in a header length register in the capture register 24A of the currently-received protocol hierarchy or the second header end timing which is obtained by the process of the sequencer 32 and transmitted using the sequence control signal SEC, and generates a header end signal PHE.

The header end timing detection circuit 36 may have a means for obtaining such a first header end timing and a means for obtaining such a second header end timing independently therein. In regard of a header having a fixed length, e.g., a header of the MAC protocol hierarchy or a header of the IPX protocol that is one protocol of the network hierarchy, the header end timing detection circuit 36 detects and uses the abovedescribed second header end timing. On the other hand, as to a header which has an optional field and a variable length such as a header of the IP protocol that is one protocol of the network protocol hierarchy, the circuit 36 detects and adopts the first header end timing.

Note that use of either the first header end timing or the second header end timing may be determined according to the protocol identification code signal PTN because a protocol type of the header to which the header end timing is applied can be judged using the protocol identification code signal PTN output from the protocol recognition circuit 26.

Upon initialization by one sequence control signal SEC from the sequencer 32, the frame end detection circuit 34 counts a pulse signal of the frame data synchronizing signal FCK and compares the count value with a value of the frame length (of the frame length signal PFL) stored/held in the capture register 24A to generate a frame end signal PFE indicating an end timing for the received frame data. The frame end detection circuit 34 is provided with a counter that is initialized by a start timing for the header of the protocol hierarchy indicated by the sequencer 32 and subjected to increment by the frame data synchronizing signal FCK.

The interrupt generation circuit 38 generates an interrupt signal IPS to the external circuit such as a computer, when the header end signal PHE produced by the header end timing detection circuit 36 or the frame end signal PFE produced by the frame end detection circuit 34 is input. Since the processes in the external circuit such as a computer are started to be executed at the header end timing or the frame end timing for the received frame data, these processes performed in the external circuit can be facilitated by outputting such an interrupt signal IPS.

The first cut-through circuit 23 and the second cutthrough circuit 25 operate to transmit information such as a protocol type code, source/destination addresses, source/destination port numbers and others included in the header for each protocol hierarchy from the input data control circuit 22 or the capture register circuit 24 to the external circuit 40, as described above. The information to be supplied to the external circuit 40 depends on functions of the data receiving device. Although the present invention is not restricted to this information, the information is the source/destination MAC addresses if the data receiving device is a bridge. Further, if the data receiving device is a router, the information is source/destination network addresses. Furthermore, if the data receiving device is a multilayer switch for relaying based on both the MAC address and the network address, the information is the source/destination MAC addresses and the source/destination network addresses. Moreover, if the data receiving device is a multilayer switch having a firewall function, the information consists of the protocol type code, the source/destination addresses and the source/destination port numbers.

In the present embodiment, combined use of the sequencer 32 capable of executing a plurality of sequences, the protocol recognition circuit 26 and the sequence selection circuit 28 for selecting one from a plurality of sequences in accordance with the recognized protocol hierarchy and directing a result of selection to the sequencer 32 enables flexible processing with respect to protocol hierarchies of various protocols.

In other words, the header of the currently-received frame data includes a parameter representing a type of the protocol hierarchy for the data to be subsequently received, and the sequencer 32 indicates a timing at which that parameter appears in the header. In accordance with the timing indicated by the sequencer 32, the protocol recognition circuit 26 identifies a type of the protocol hierarchy actually indicated by the parameter and informs the sequence selection circuit 28 of a result of recognition. Based on the result of recognition by the protocol recognition circuit 26, the sequence selection circuit 28 determines a sequence for processing the header of the protocol hierarchy to be subsequently received and directs that sequence to the sequencer 32 with a timing at which the currentlyprocessed header is terminated.

In the present embodiment, there is provided the capture register circuit 24 which is constituted by a plurality of registers and has a function for storing parameters included in the header to a predetermined register in accordance with a direction from the sequencer 32. Parameters stored in the register of the capture register circuit 24 can be read out to the external circuit through the CPU bus. The capture register circuit 24 has such a structure as that any desired parameter can be read out by the software irrespective of a difference in position of the respective parameters within the header which is caused by a difference in protocols of the received frame data or in protocol hierarchies constituting the protocols.

Moreover, in the present embodiment, there is provided a such a function as that the sequencer 32 detects a position of the parameter within the header representing a destination address and that parameter is sent to the external circuit 40 as the above-described retrieval key data signal SKD or second retrieval key data signal SKD2. Therefore, a path along which the received frame data is transmitted can be set at high speed by installing outside a table from which information relating to the destination is fetched using that parameter indicating the destination address.

Also, the input data control circuit 22 has a function for carrying out error control over the header of each protocol hierarchy or the frame data using, for example, the checksum in accordance with control by the sequencer 32. Such error control can be flexibly applied to any protocol hierarchy of target protocol even if the header lengths or the frame lengths differ.

As mentioned above, in the present embodiment, there is provided the interrupt generation circuit 38 for outputting the interrupt signal IPS to an external computer if a header end timing of each protocol hierarchy and the end timing for the frame data are detected. If the present embodiment is used in the internetwork repeater and the transmission operation is started in the external computer using the interrupt signal IPS indicating the end timing for the header, the process is enabled with relay of the frame data rarely delayed. Additionally, if the present embodiment is used in the internetwork repeater and the transmission operation for relaying the received frame data is started by the ID of the end timing for the frame data, the highly-reliable relay operation is enabled.

The advantages of the embodiment will be described in detail with reference to timing charts.

FIGS. 12 to 15 are a series of timing charts showing the operation of this embodiment when the frame data based on the DIX-IP-TCP protocol is received. In FIGS. 12 through 15, the continuously-elapsed operation is divided into four for convenience's sake.

In FIGS. 12 to 15 and FIGS. 16 to 19 which will be described later, reference characters DI, WR and ST denotes the frame data FD1, the frame data synchronizing signal FCK and the sequence start signal ST which are shown in FIG. 1, respectively. In addition, reference characters DO and SB designates an output frame data signal and an output data synchronizing signal which are continuously output when the protocol recognition circuit 26 recognizes a protocol of the network layer and the LLC/SNAP header relative thereto is added, respectively. In FIGS. 12 to 15, pulse numbers "1", . . . "32" to "x" are added to WR (reference characters WR1, . . . WR32, . . . WRx are used hereinbelow) and pulse numbers "1", . . . , "29" to "x" are added to SB (reference characters SB1, . . . , SB29, . . . , "SBx" are used hereinbelow) for brief explanation. In FIGS. 16 to 19, pulse numbers "1", . . . , "35" to "x" are added to WR (reference characters WR1, . . . , WR35, . . . WRx are used hereinbelow) and pulse numbers "1", . . . , "32" to "x" are added to SB (reference characters SB1, . . . . . SB32, "SBx" are used hereinbelow) similarly.

Referring to FIGS. 12 to 15, in case of DIX-IP-TCP, a pulse of the sequence start signal ST is input from outside as reception of the frame data is started in WR1. Thereafter, the MAC header data MAH is received in accordance with WR1 to WR7. The MAC header data MAH is constituted by MAC address data MAA and protocol type data ET. In particular, a type of the following IP protocol can be identified by the protocol type data ET. In addition, MAC capsule data LL1 of DO is determined by the MAC address data MAA and the protocol type data ET. The MAC capsule data LL1 is output in synchronism with SB1 to SB4.

The IP header data IPH is constituted by IP protocol information IP1 to IP8. Here, the IP protocol information IP1 indicates a header length; the IP protocol information IP2, a frame length; the IP protocol information IP6, a source network address; and the IP protocol information IP7, a destination network address. The IP protocol information IP8 is an optional field whose existence or length can be arbitrarily set.

TCP header data TCPH received in synchronism with WR20 to WR31 has TCP protocol information TC1 to TC9. The TCP protocol information TC1 indicates a receive port of the internetwork repeater using the data receiving device according to this embodiment and the TCP protocol information TC2 indicates a transmit port. The TCP protocol information TC3 indicates a serial number of the received frame data. Further, TCP transmit data TCPD following the TCP header data TCPH is received. These TCP header data TCPH and the TCP transmit data TCPD are based on the TCP protocol.

Here, those based on the TCP protocol can be substituted by those based on the ICMP protocol or the UDP protocol.

Note that the IP protocol information IP1 is made up of parameters of Version (four bits), IHL (header length consisting of four bits) and TOS (type of service consisting of eight bits). Further, the IP protocol information IP4 is constituted by TTL (time to live, eight bits) and a protocol code representing a protocol of the transport layer. Incidentally, the TCP protocol information TC4 indicates an acknowledge number; the TCP protocol information TC5, an offset/flag; the TCP protocol information TC6, a window; the TCP protocol information TC8, an object pointer; and the TCP protocol information TC9, an optional field.

To sum up, the operations B1 to B18 of the present embodiment in the above-described DIX-IP-TCP protocol are as follows.

Operations B1 to B18 in the DIX-IP-TCP protocol:

Operation B1:

ET is fetched into a first step of the pipeline 22A by WR7. The protocol recognition circuit 26 receives data of the first step of the pipeline 22A by a direction from the sequencer 32 with a timing of WR8 to recognize the protocol of the network layer. With this operation, LL1 is generated and set in the second, third, fourth and fifth steps of the pipeline 22A.

Operation B2:

An output from the fifth step of the pipeline 22A is output as DO at a falling edge of WR7, and output of SB is started.

Operation B3:

The sequencer 32 directs end of the header with a timing of WR12, and the sequence selection signal SES for MAC header processing is changed to the signal SES for network layer header processing to initialize the sequence counter 30 with a timing of direction by the sequencer 32. At the same time, the sequencer 32 transmits an initialization signal to the frame end detection circuit 34. With this timing, interrupt is generated to the CPU.

Operation 4:

IP1 is fetched to the fifth step of the pipeline 22A by WR12. The data indicating the header length in IP1 is transmitted from an output of the fifth step of the pipeline 22A to be stored in the header length register in the capture register 24A with a timing of WR13.

Operation B5:

IP2 is fetched to the fifth step of the pipeline 22A by WR13. Further the data indicating the frame length in IP2 is transmitted from an output of the fifth step of the pipeline 22A to be stored in the frame length register within the capture register 24A with a timing of WR14.

Operation B6:

IP4 is fetched to the fifth step of the pipeline 22A by WR16. The data indicating the protocol of the transport layer in IP4 is sent from an output of the fifth step of the pipeline 22A to be stored in the transport layer protocol register in the capture register 24A with a timing of WR17.

Operation B7:

IP7 is fetched to the fourth and fifth steps of the pipeline 22A by WR20. With a timing of WR21, the data which is included in IP7 and indicates the destination address is supplied from outputs of the fourth and fifth steps of the pipeline 22A to be stored in the destination address register in the capture register 24A. At the same time, data at the fourth and fifth steps of the pipeline 22A is output to the retrieval table of the external circuit 40.

Operation B8:

IP8 is fetched to the fourth and fifth steps of the pipeline 22A by WR22. With a timing of WR23, the optional data included in IP8 is fed from outputs of the fourth and fifths steps of the pipeline 22A to be stored in the optional register in the capture register 24A. At the same time, a flag representing that the optional data exists is set.

Operation B9:

With a timing of WR24, the header end timing detection circuit 36 detects coincidence between the content of the header length register and a value of the sequence counter 30, and the sequence selection signal SES for network layer header processing is changed to the signal SES for transport layer header processing to initialize the sequence counter 30 with a timing of detection. With the timing of initialization, interrupt is generated to the external CPU.

Operation B10:

TC1 is fetched to the fifth step of the pipeline 22A by WR24. With a timing of WR25, the data which is included in TC1 and indicates the source port number is fed from an output of the fifth step of the pipeline 22A to be stored in the source port number register in the capture register 24A.

Operation B11:

TC2 is fetched to the fifth step of the pipeline 22A by WR25. With a timing of WR26, the data which is included in TC2 and indicates the destination port number is supplied from an output of the fifth step of the pipeline 22A to be stored in the destination port number register within the capture register 24A.

Operation B12:

TC3 is fetched to the fourth and fifth steps of the pipeline 22A by WR26. The data which is included in TC3 and indicates the sequence number is transmitted from outputs of the fourth and fifth steps of the pipeline 22A to be stored in the sequence number register in the capture register 24A with a timing of WR27.

Operation B13:

TC4 is fetched to the fourth and fifth steps of the pipeline 22A by WR28. The data which is included in TC4 and indicates the acknowledge number is supplied from outputs of the fourth and fifth steps of the pipeline 22A to be stored in the acknowledge number register within the capture register 24A with a timing of WR29.

Operation B14:

TC5 is fetched to the fifth step of the pipeline 22A by WR30. The data which is included in TC5 and indicates the offset/flag is fed from an output of the fifth step of the pipeline 22A to be stored in the offset/flag register in the capture register 24A with a timing of WR31.

Operation B15:

TC6 is fetched to the fifth step of the pipeline 22A by WR31. Further, with a timing of WR32, the data which is included in TC6 and indicates the window is sent from an output of the fifth step of the pipeline 22A to be stored in the window register in the capture register 24A.

Operation B16:

TC8 is fetched to the fifth step of the pipeline 22A by WR33. The data which is included in TC8 and indicates the urgent pointer is fed from an output of the fifth step of the pipeline 22A to be stored in the urgent pointer register in the capture register 24A with a timing of WR34.

Operation B17:

The sequencer 32 directs the header end with a timing of WR36, and the sequence selection number for end of the transport layer header is changed to that for idling to initialize the sequence counter 30 with a timing of direction. In addition, interrupt is generated to the CPU with this timing.

Operation B18:

The frame end detection circuit 34 detects coincidence between a value of the internal counter and an output from the frame length register and terminates the frame process with a timing of SBx. Additionally, interrupt is generated to the CPU with this timing.

FIGS. 16 to 19 are timing charts showing operation of the present embodiment when the frame data based on the DIX-IPX-SPX protocol is received. In FIGS. 16 to 19, a continuously-elapsed timing chart is divided into four for the convenience's sake.

In WR1, the sequence start signal ST is input from outside as reception of the frame data is started. In WR1 to WR7, the MAC address data MAH constituted by the MAC address data MAA and the protocol type data ET is received as in FIGS. 12 to 15. The MAC capsule data LL1 determined according to the received MAC address data MAA and the protocol type data ET is output as DO in synchronism with SB1 to SB4.

The IPX header data IPXH is subsequently received in synchronism with WR8 through WR22. The IPX header data IPXH is configured by the IPX protocol information IX1 through IX9. Here, the IPX protocol information IX1 is a checksum of the IPX header data IPXH. The IPX protocol information IX2 is a header length of the IPX header data IPXH. The IPX protocol information IX3 is a transport control/packet type. The IPX protocol information IX4 is a destination network address, and the IPX protocol information IX5 is a node address at which a destination terminal is provided. The IPX protocol information IX6 is a destination socket address. The IPX protocol information IX7 is a source network address, and the IPX protocol information IX8 is a source node address. The IPX protocol information IX9 is a source socket address.

The SPX header data SPXH is then received in synchronism with WR pulse signals of WR23 to WR28. The SPX header data SPXH is composed of SPX protocol information SP1 through SP6. Here, the SPX protocol information SP1 is data indicating a connection control/data type. The SPX protocol information SP2 is a source ID (identification or identifier), and the SPX protocol information SP3 is a destination ID. The SPX protocol information SP4 is a serial number of the frame data, and the SPX protocol information SP5 is an acknowledge number. The SPX protocol information SP6 is an allocation number.

Figure 19:
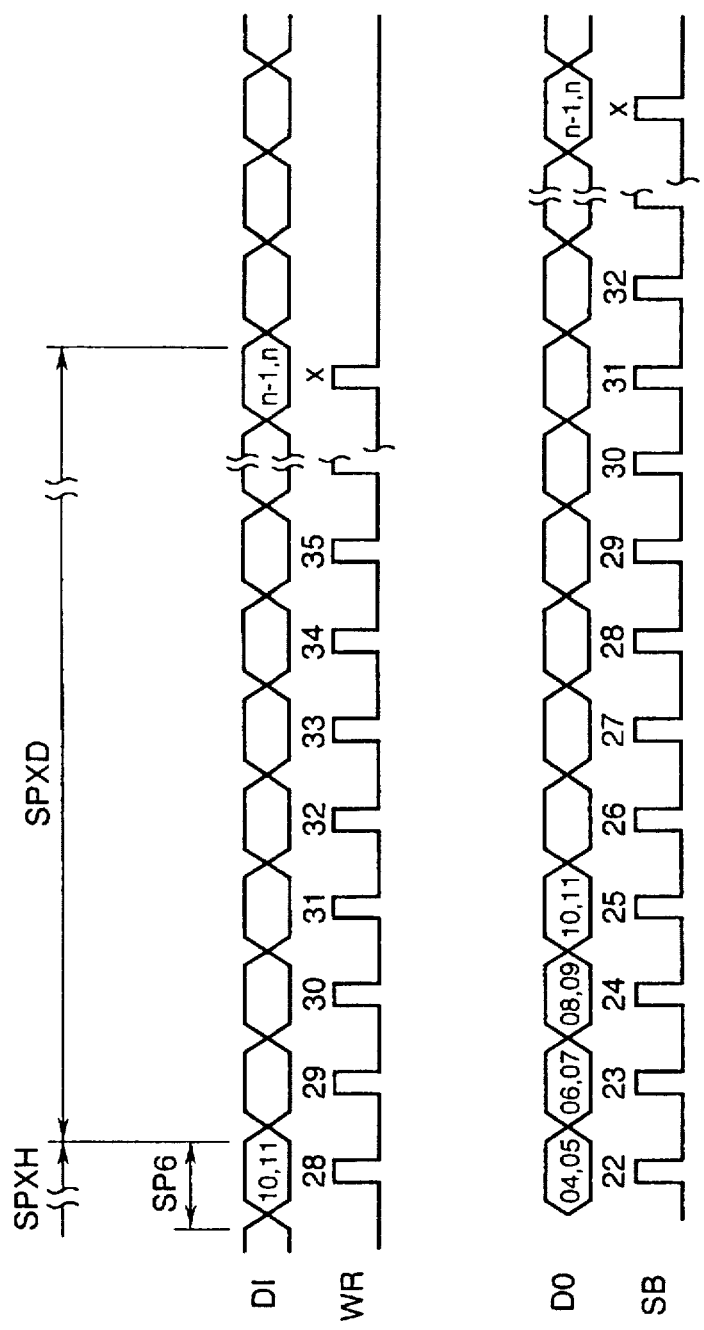
FIG. 19 is a timing chart continued from FIG. 18.

Following the SPX header data SPXH, the SPX transmit data SPXD is received. These SPX header data SPXH and the SPX transmit data SPXD are defined by one protocol hierarchy. In FIG. 19, the SPX transmit data SPXD consists of n bytes.

To sum up, the operations C1 through C14 of the present embodiment in the above-described DIX-IPX-SPX protocol are as follows.

Operations C1 to C14 in the DIX-IPX-SPX protocol:

The operations C1 through C3 are the same with the operations B1 through B3, thereby omitting the explanation thereof.

Operation C4:

IX2 is fetched to the fifth step of the pipeline 22A by WR13. Further, the data which is included in IX2 and indicates the frame length is fed from an output of the fifth step of the pipeline 22A to be stored in the frame length register within the capture register 24A with a timing of WR14.

Operation C5:

IX3 is fetched to the fifth step of the pipeline 22A by WR14. The data which is included in IX3 and indicates the transport layer protocol is transmitted from the output of the fifth step of the pipeline 22A to be stored in the transport layer protocol register in the capture register 24A with a timing of WR15.

Operation C6:

IX4 is fetched to the fourth and fifth steps of the pipeline 22A by WR15. The data which is included in IP4 and indicates the destination network address is fed from outputs of the fourth and fifth steps of the pipeline 22A to be stored in the source address register in the capture register 24A with a timing of WR16. At the same time, the data at the fourth and fifth steps of the pipeline 22A is output to the external retrieval table.

Operation C7:

IX6 is fetched to the fifth step of the pipeline 22A by WR20. The data that is included in IX6 and indicates the destination socket number is fed from the output of the fifth step of the pipeline 22A to be stored in the destination port number register within the capture register 24A with a timing of WR21.

Operation C8:

IX9 is fetched to the fifth step of the pipeline 22A by WR26. The source socket number included in IX9 is fed from the output of the fifth step of the pipeline 22A to be stored in the source port number register within the capture register 24A with a timing of WR27.

Operation C9:

With a timing of WR27, the sequencer 32 directs end of the header, and the sequence selection signal SES is changed from a signal for the network layer header processing to a signal for the transport layer header processing to initialize the sequence counter 30 with a timing of direction. Further, with this timing, interrupt is generated to the CPU.

Operation C10:

SP4 is fetched to the fifth step of the pipeline 22A by WR30. The data which is included in SP4 and indicates the sequence number is supplied from the output of the fifth step of the pipeline 22A to be stored in the sequence number register with a timing of WR31.

Operation C11:

SP5 is fetched to the fifth step of the pipeline 22A by WR31. The data that is included in SP5 and indicates the acknowledge number is supplied from the output of the fifth step of the pipeline 22A to be stored in the acknowledge number register in the capture register 24 with a timing of WR32.

Operation C12:

SP6 is fetched to the fifth step of the pipeline 22A by WR32. The data that is included in SP6 and indicates the allocation is fed from the output of the fifth step of the pipeline 22A to be stored in the offset/flag register in the capture register 24A with a timing of WR33.

Operation C13:

The sequencer 32 directs end of the header with a timing of WR33, and the sequence selection number for the transport layer header processing is changed to the number for idling to initialize the sequence counter 30 s at a timing of direction. Also, interrupt is generated to the CPU with this timing.

Operation C14:

The frame end detection circuit 34 detects a coincidence between a value of the internal counter and an output from the frame length register to terminate the frame process with a timing of SBx. Further, interrupt is generated to the CPU with this timing.

In this embodiment, the input data control circuit 22 is provided with the five-step pipeline 22A, and the operation and advantage of the pipeline 22A will now be described in detail.

Figure 20:
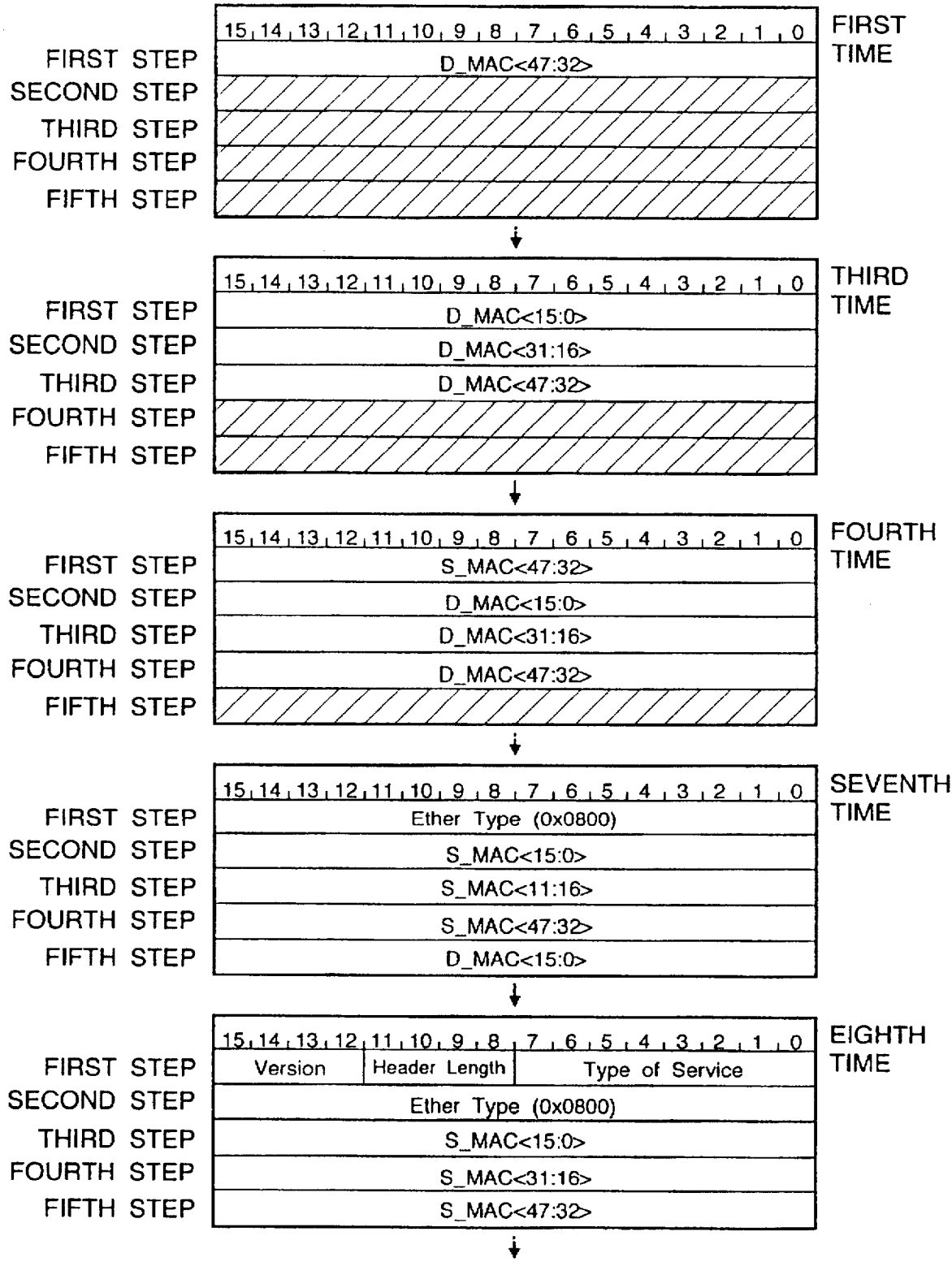
FIG. 20 is a conceptual view showing the operation of a pipeline in the input data control circuit when data frame having network layer protocol of IP is received in the DIX format.
Figure 21:
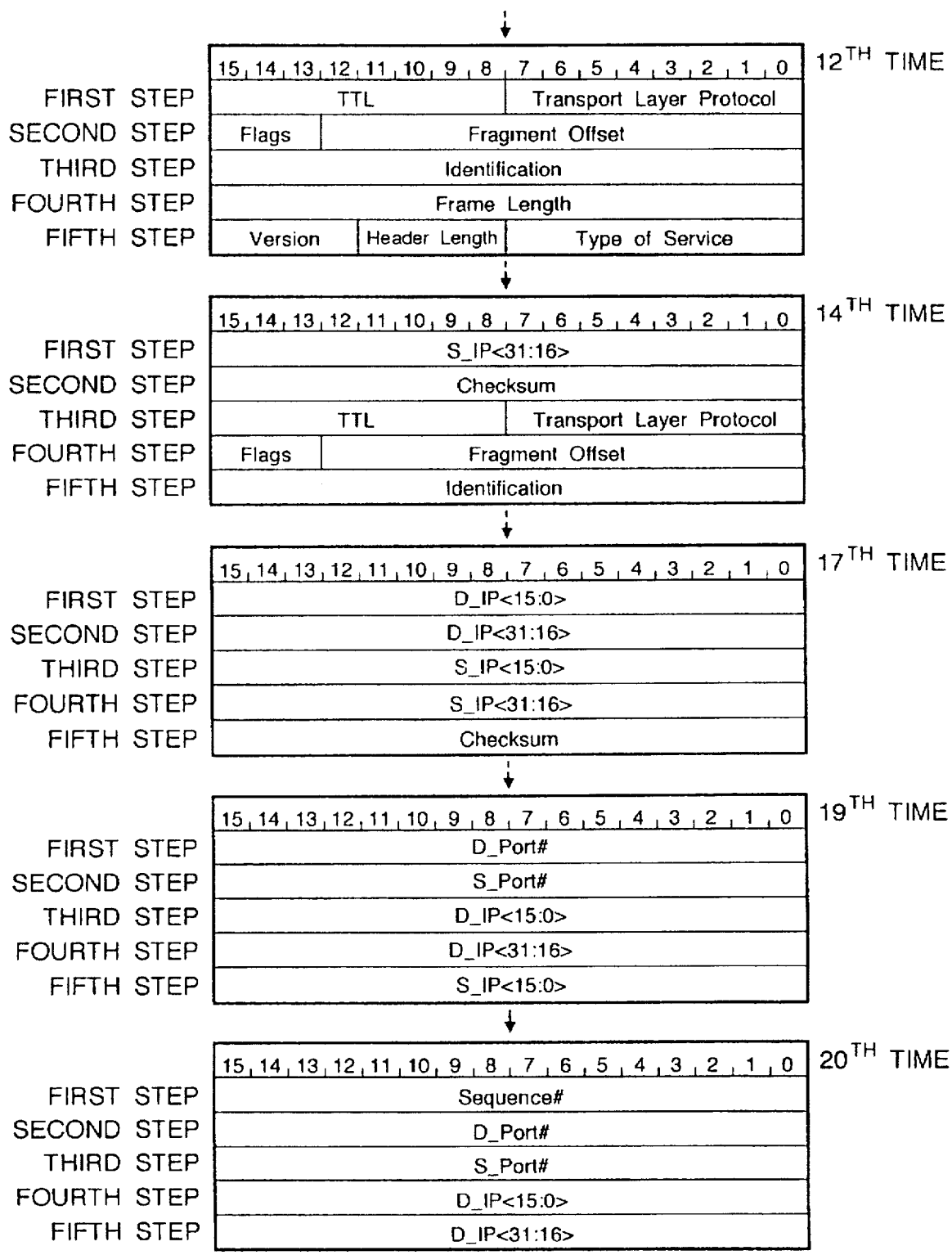
FIG. 21 is a conceptual view continued from FIG. 20.
Figure 22:
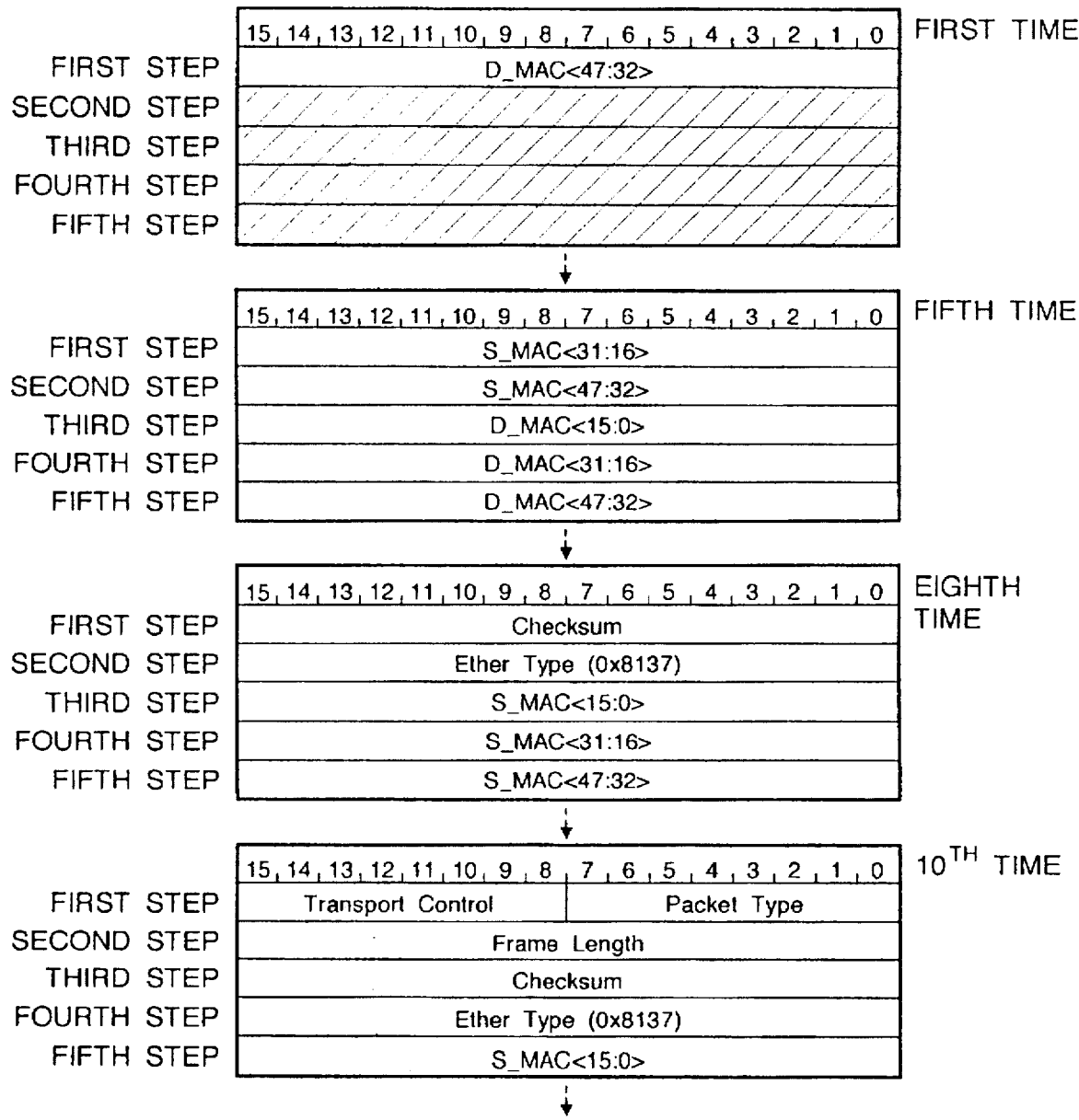
FIG. 22 is a conceptual view showing the operation of the pipeline when data frame having network layer protocol of IPX is received in the DIX format.
Figure 23:
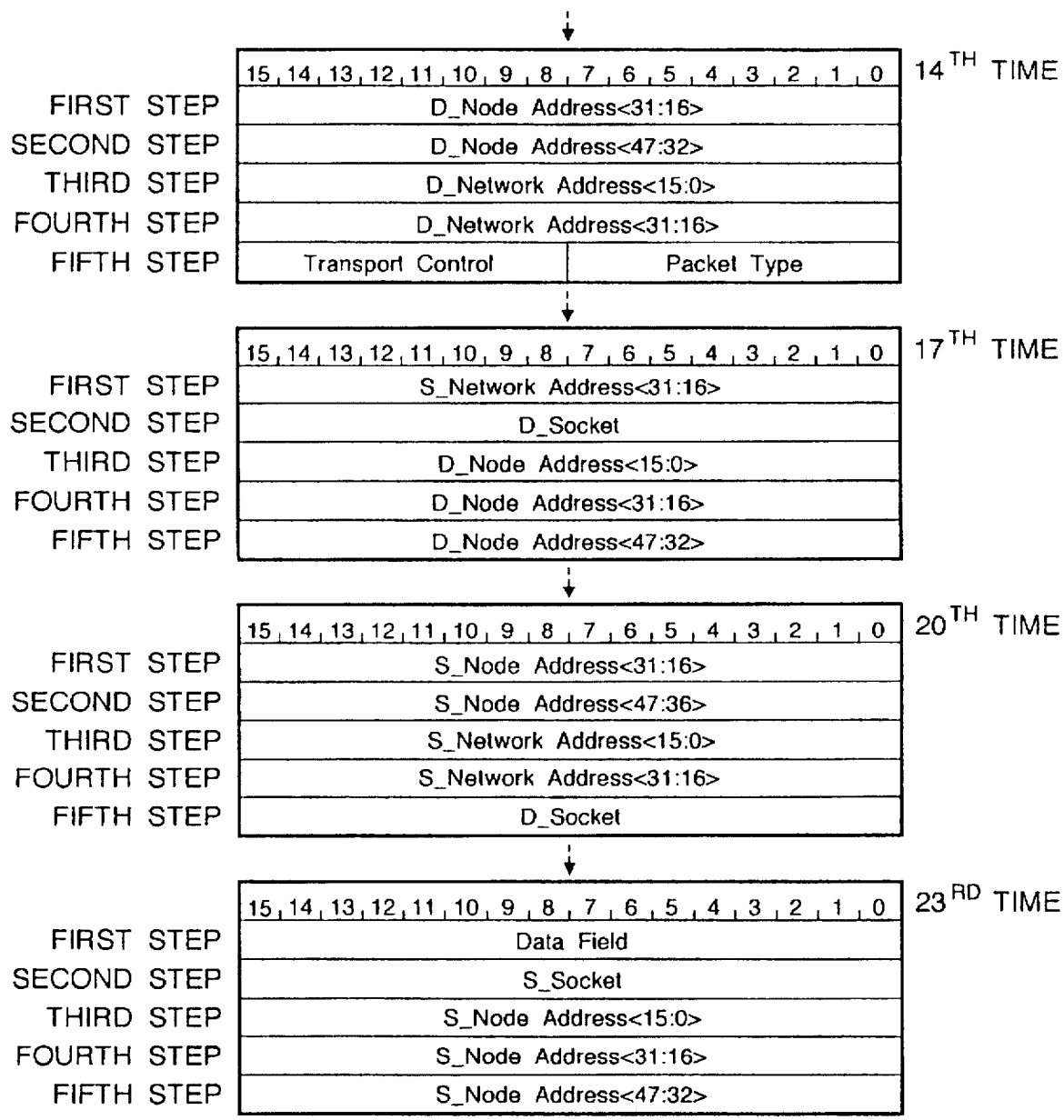
FIG. 23 is a conceptual view continued from FIG. 22.
Figure 24:
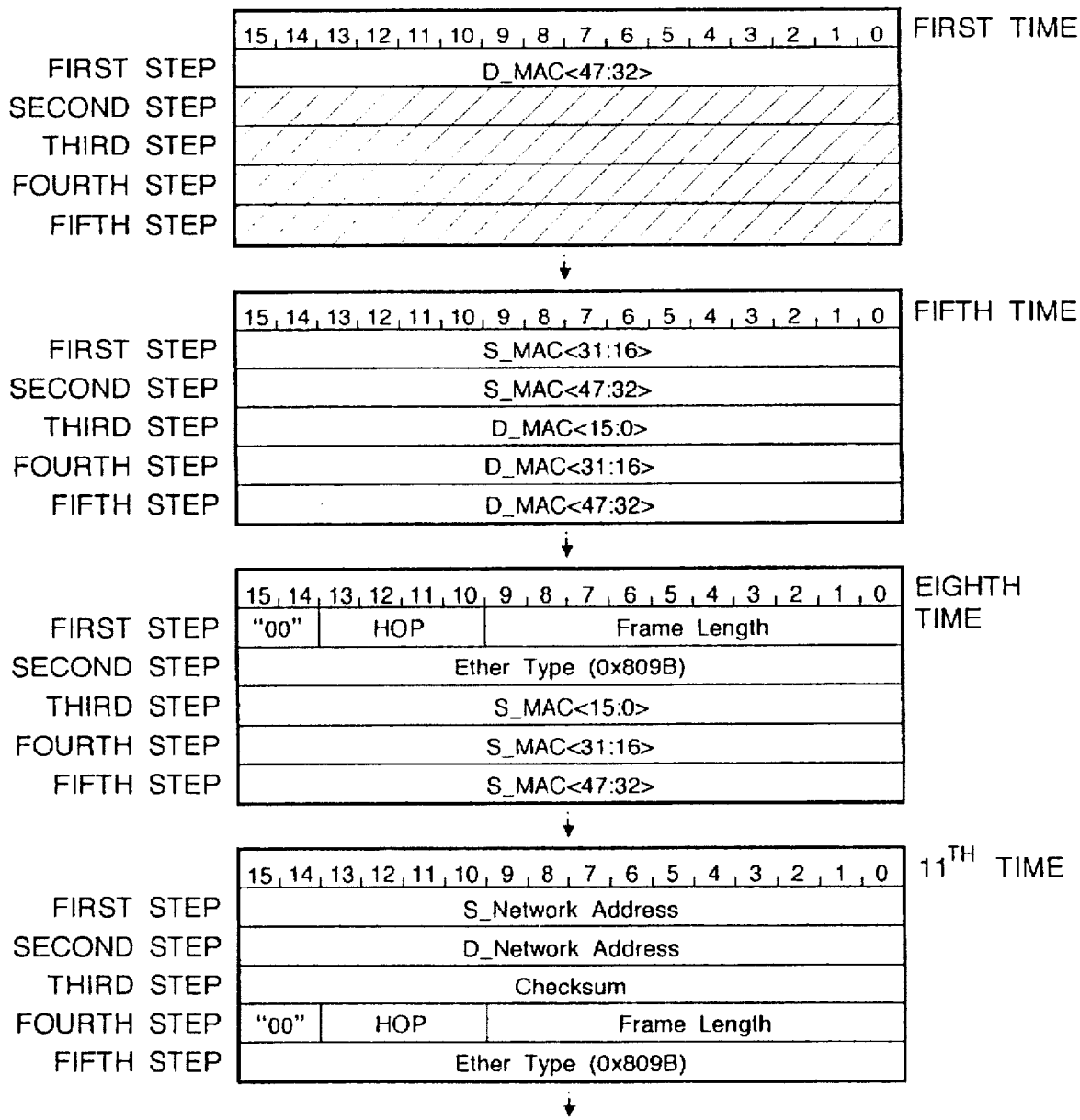
FIG. 24 is a conceptual view showing the operation of the pipeline when data frame having network layer protocol of Apple Talk is received in the DIX format.

FIGS. 20 and 21 are conceptual views showing the operation of the pipeline 22A when the data receiving device receives the data frame based on the network layer protocol of IP in the DIX format; FIGS. 22 and 23, conceptual views showing the operation of the pipeline 22A when the data receiving device receives the data frame based on the network layer protocol of IPX in the DIX format; and FIGS. 24 and 25, conceptual views showing the operation of the pipeline 22A when the data receiving device receives the data frame based on the network layer protocol of Apple Talk in the DIX format.

As shown in FIG. 2, the pipeline in the present embodiment consists of five registers each having a data width of, e.g., 16 bits, and it operates using the frame data synchronizing signal FCK as the operation clock as s shown in FIG. 4.

Firstly, the frame data FD1 is fetched to the first register, and data held by each register is shifted to the next register at the same time. An output from the fifth register is eliminated.

When reception of the data frame is started, the pipeline 22A receives the source MAC address (represented as S_MAC in the drawing) after receiving the destination MAC address (represented as D_MAC in the drawing) as shown in FIG. 20. Since each of these MAC addresses consists of 48 bits, all the bits of each address are fetched into the pipeline 22A by using the synchronizing signal FEC three times in the present embodiment in which the frame data FD1 consists of 16 bits. In the operation according to the present embodiment, outputs from the fourth, third and second steps of the pipeline are loaded in the register for storing/holding the destination MAC address within the capture register 24A at the fourth time in FIG. 20. Similarly, at the seventh time in FIG. 20, outputs from the fourth, third and second steps of the pipeline are loaded in the register for storing/holding the source MAC address within the capture register 24A. Also, in case of the IP address consisting of 32 bits, outputs from the fourth and third steps of the pipeline are loaded in the register for storing/holding the source IP address (represented as S_IP in the drawing) within the capture register 24A at the 17th time in FIG. 21; and outputs from the fourth and third steps of the pipeline are loaded in the register for storing/holding the destination IP address (represented as D_IP in the drawing) within the capture register 24A at the 19th time in FIG. 21.

In this manner, by providing the pipeline 22A, the operation for loading the parameter having a data length of 48 bits which is longer than the data input width of 16 bits in the capture register 24A can be completed at a time to simplify the operation of the sequencer 32.

In addition, the processing using the pipeline is effective when processing the port number (or the socket number). When the network layer protocol is based on the IP, each of the destination and source port numbers consists of 16 bits. Also, if the network layer protocol is based on the IPX, each of the destination and source socket numbers consists of 16 bits. On the other hand, if the network layer protocol is based on the Apple Talk, each of the destination and source socket numbers consists of eight bits. The following describes how the data having different data widths are processed with reference to the drawings.

In the operation according to the present embodiment, if the network layer protocol is based on the IP, an output from the second step of the pipeline is loaded to a register for storing/holding the source port number (represented as S_Port # in the drawing) within the capture register 24A at the 19th time in FIG. 21; and an output from the second step of the pipeline is loaded in a register for storing/holding the destination port number (represented as D_Port # in the drawing) within the capture register 24A at the 20th time in FIG. 21.

If the network layer protocol is based on the IPX, an output from the second step of the pipeline is loaded in a register for storing/holding the destination socket number (represented as D_Socket in the drawing) within the capture register 24A at 17th time in FIG. 23; and an output from the second step of the pipeline is loaded in a register for storing/holding the source socket number (represented as S_Socket in the drawing) within the capture register 24A at the 23rd time in FIG. 23.

Figure 25:
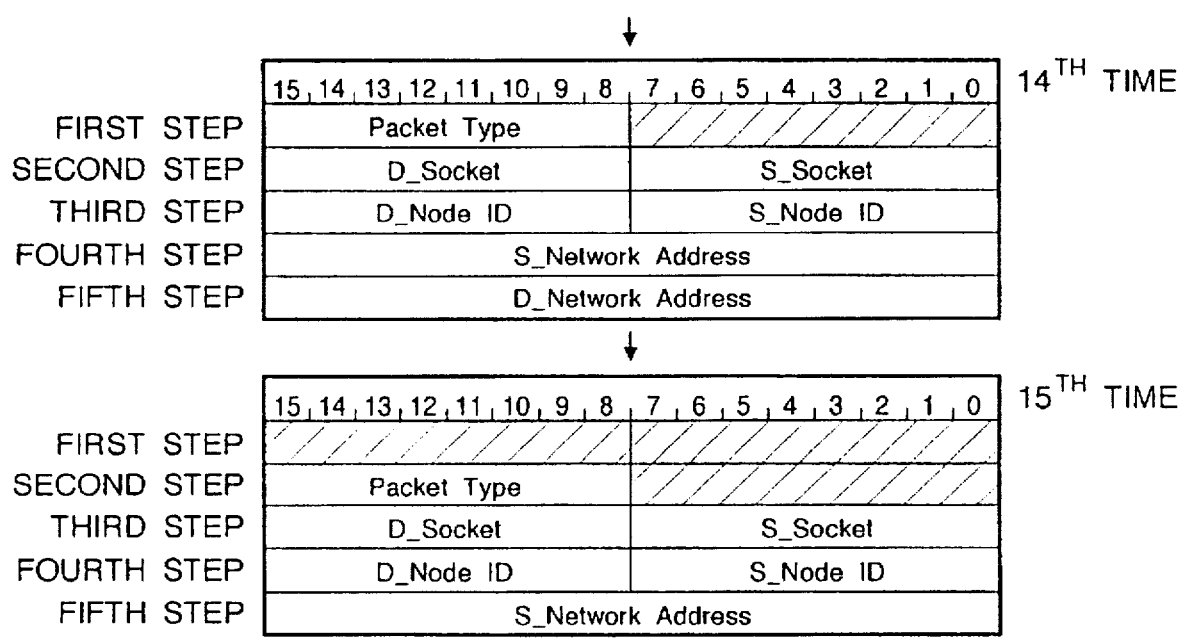
FIG. 25 is a conceptual view continued from FIG. 24.

If the network layer protocol is based on the Apple Talk, the upper eight bits in an output from the second step of the pipeline are loaded in a register for storing/holding the destination socket number (D_Socket) within the capture register 24A at the 14th time and the lower eight bits in an output from the third step of the pipeline are loaded in a register for storing/holding the source socket number (S_Socket) within the capture register 24A at the 15th time, as shown in FIG. 25.

Even if there is a difference in length of data depending on the protocols, the flexible processing can s be executed by providing the pipeline and utilizing the time for passing the data in the pipeline.

Further, the processing using the pipeline is effective when a plurality of data fields exist at the same step of the pipeline and the processes are carried out with respect to these data fields. If the network layer protocol is based on the IP, a TTL (Time to Live) field and the transport layer protocol field are input to the same step as shown in a portion of the 12th time in FIG. 21. Here, as to the TTL field, the transport control field corresponding with the TTL field and the packet type field are input to the same step of the pipeline as shown in a portion of the 10th time in FIG. 22 in case of IPX, and the HOP field corresponding with the TTL field and the frame length field are input to the same step of the pipeline as shown in a portion of the 8th time in FIG. 24 in case of the Apple Talk. If the processing is performed without using the pipeline, there are required a sequence for simultaneously processing the TTL field and the transport layer protocol field in case of IP; a sequence for simultaneously processing the transport control field and the packet type field in case of IPX; and a sequence for simultaneously processing the HOP field and the frame length field in case of Apple Talk, which leads to the complicated processing sequences. By providing the pipeline, the processing for the same field can be commonly carried out irrespective of the protocols.

Additionally, the pipeline 22A in the input data control circuit 22 is effective for encapsulating the data. In this case, an output of the fifth register is used as an output of the data receiving device. When relaying a data frame of the Ethernet to the ATM network, the header of the MAC layer is first removed and the LLC/SNAP or the LAN emulation header is added to create a CPCS-PDU pay-load portion of the AAL-5 layer. The LLC/SNAP is a code which indicates a type of protocol of the network layer and consists of eight bytes, and it becomes "AA-AA-03-00-00-00-08-00" when based on IP. The code "08-00" that is the Ether type is held in the second register as shown in a portion of the 8th time in FIG. 22. With this timing, generation of the LLC/SNAP is completed by loading "AA—AA" to the fifth register, "03-00" to the fourth register and "00—00" to the third register. Upon completion of this processing and after a timing of the 8th time, a CPCS-PDU pay-load portion can be readily created by determining an output of the fifth register as an output of the data receiving device.

Figure 26:
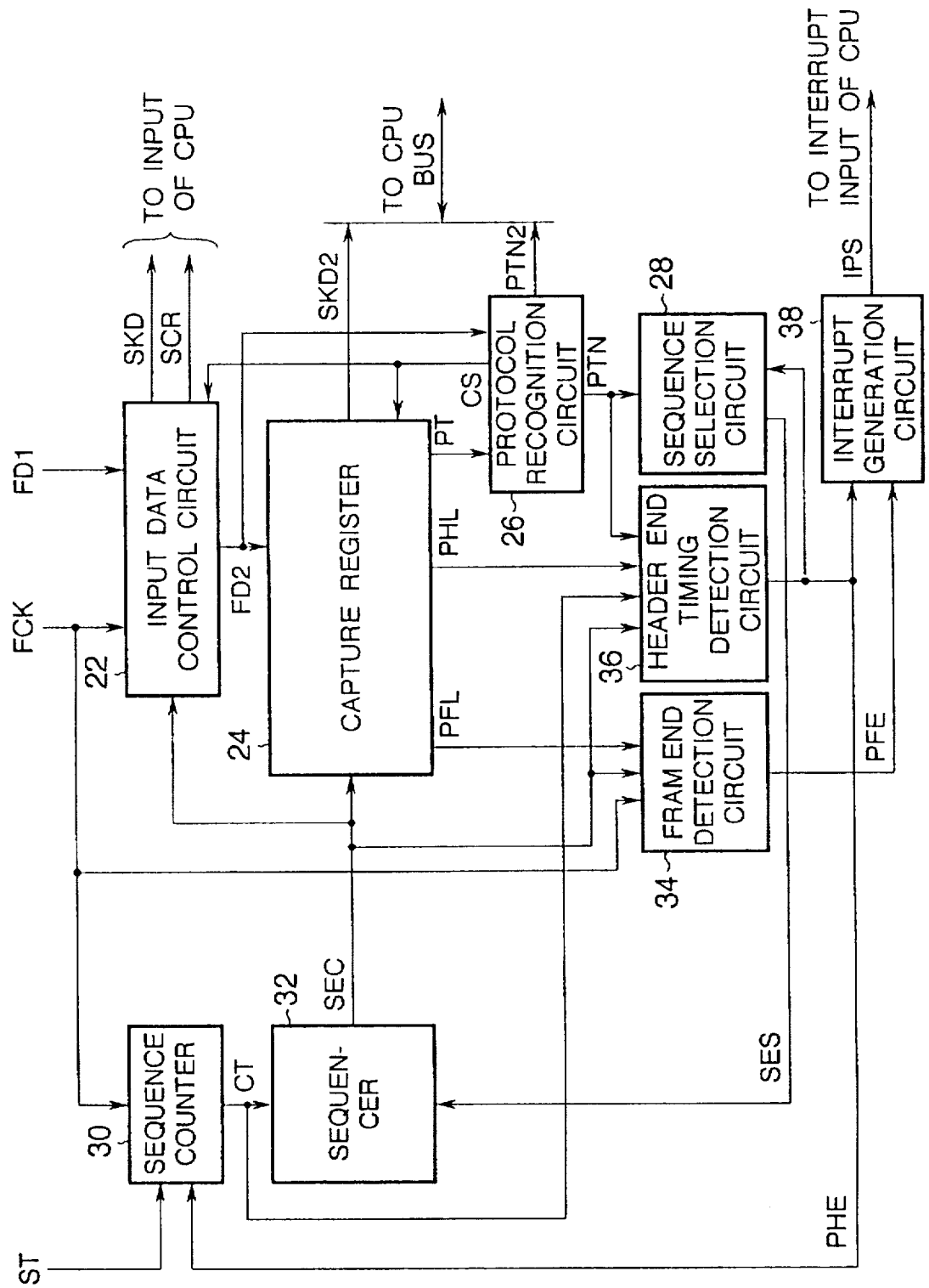
FIG. 26 is a block diagram showing the structure of a second embodiment of a data receiving device according to the present invention.

A second embodiment according to the present invention will now be described with reference to FIG. 26.

In the second embodiment, a cut-through circuit for selecting any of signals output from the first cut-through circuit 23 and the second cut-through circuit 25 is provided in the protocol recognition circuit 26.

Any other structure of the second embodiment is substantially similar to that of the first embodiment, thereby omitting the explanation thereof.

In the second embodiment, the input data control circuit 22 and the capture register circuit 24 validates or invalidates the operation of the first cut-through circuit 23 or the second cut-through circuit 25 in accordance with the cut-through selection signal CS output from the cut-through selection circuit. The cut-through selection circuit therefore selects either the first cut-through circuit or the second cut-through circuit so as to output a signal to the external circuit. Provision of such the first cut-through circuit, the second cut-through circuit and the cut-through selection circuit can facilitate the processing in the external circuit (represented as the CPU in FIG. 1) such as a computer.

Figure 27:
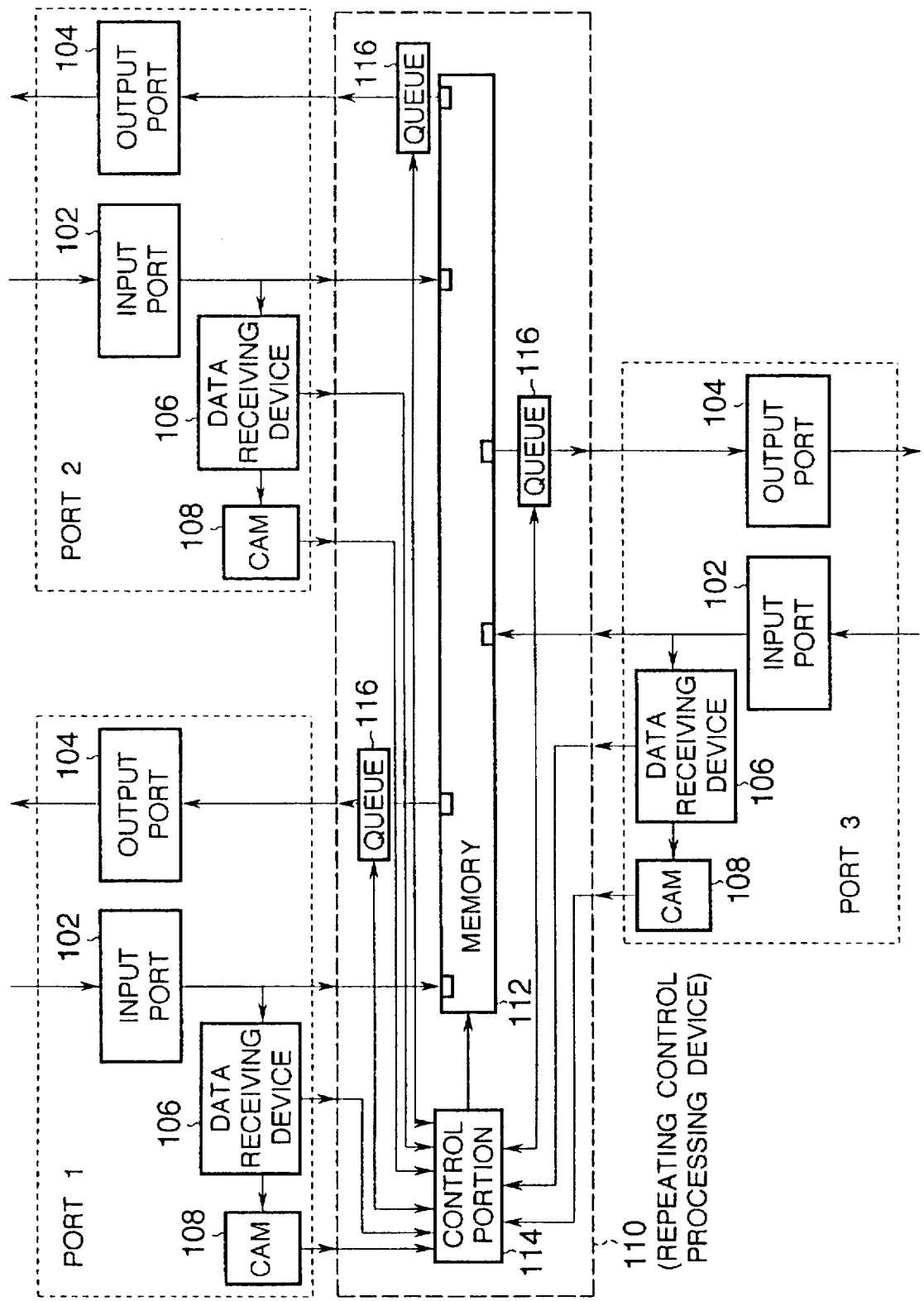
FIG. 27 is a block diagram showing the embodiment in which the present invention is applied to a repeater.

FIG. 27 shows an example in which the present invention is applied to a repeater such as a bridge or a router.

In this embodiment, the repeater is provided with three ports, i.e., ports 1 through 3 and a repeating control processing device 110. Each port includes an input port 102 for receiving a data frame; an output port for outputting a data frame; a data receiving device 106 according to the present invention which receives the data frame supplied to the input port 102 and performs the operation described in connection with the above embodiment; and a CAM 108 for executing the above-described table retrieval using the data output by the first cut-through circuit and the second cut-through circuit as key data for retrieval.

The repeating control processing device 110 is provided with: a data storing portion (referred to as a memory) 112 that is composed by any one of a memory, a buffer, a bus, a switch and others for storing the data frame received from the input port 102; a control portion 114 for determining propriety of linking and a target link; and a transmit queue 116 which adds the data frame stored in the memory 112 to a queue and outputs it to an output port of the linked port when its turn comes.

Figure 28:
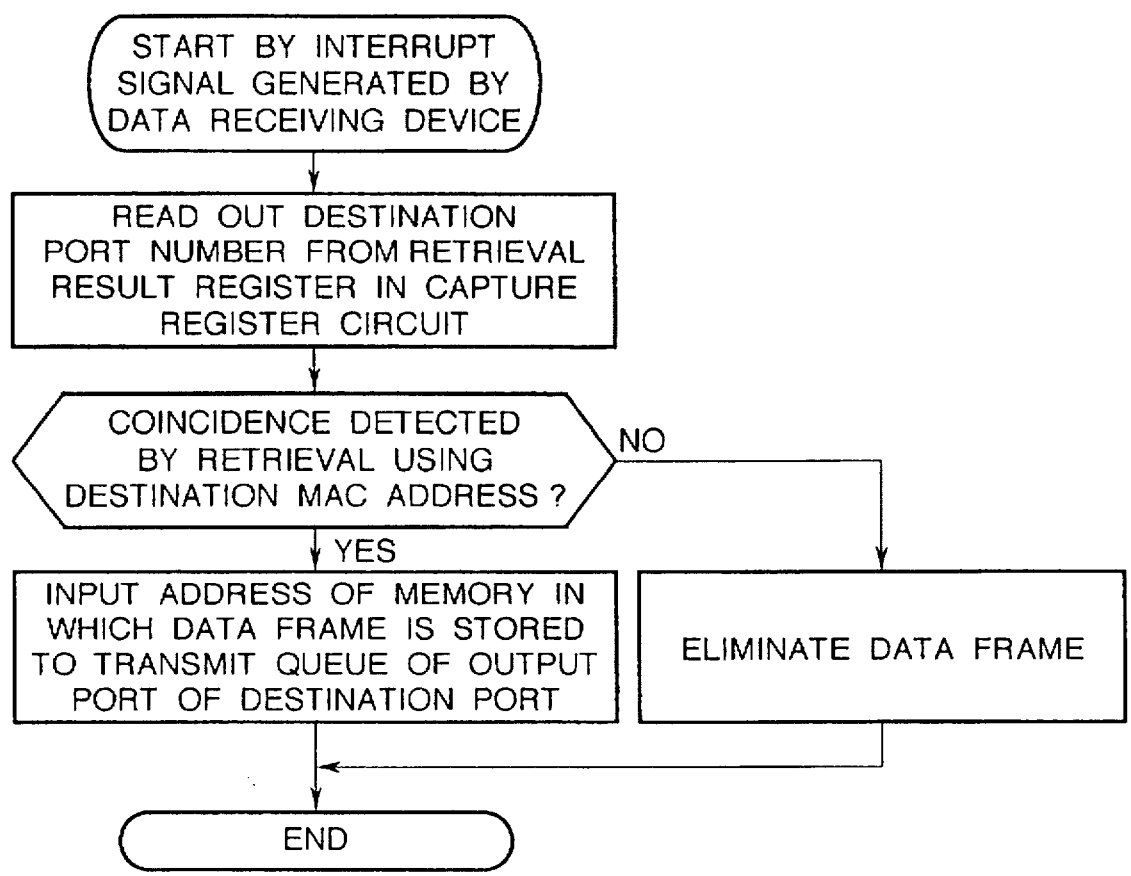
FIG. 28 is a flowchart showing a sequence of the repeating operation when the repeater is a bridge.

The operation of the embodiment will be explained. When the data frame is received from the input port 102, the data frame is stored in the memory 112 in the repeating control processing device 110 and simultaneously input to the data receiving device 106 so that the operation described in connection with the above embodiment is executed by the data receiving device 106. In the operation, if the repeater is a bridge, the source/destination MAC addresses are output to the CAM 108 and the retrieval operation shown in FIG. 7 is carried out. The repeating control processing device 110 uses any interrupt signal generated by the data receiving device 106 to read out a result of retrieval from the register 25C within the capture register circuit 24, for storing/holding the result of retrieval obtained by the CAM 108. When a destination to be relayed is determined by the read result of retrieval, the repeating control processing device 110 executes the process for outputting the data frame received in the memory 112 to the corresponding output port 104. FIG. 28 shows the sequence of the repeating operation.

Figure 29:
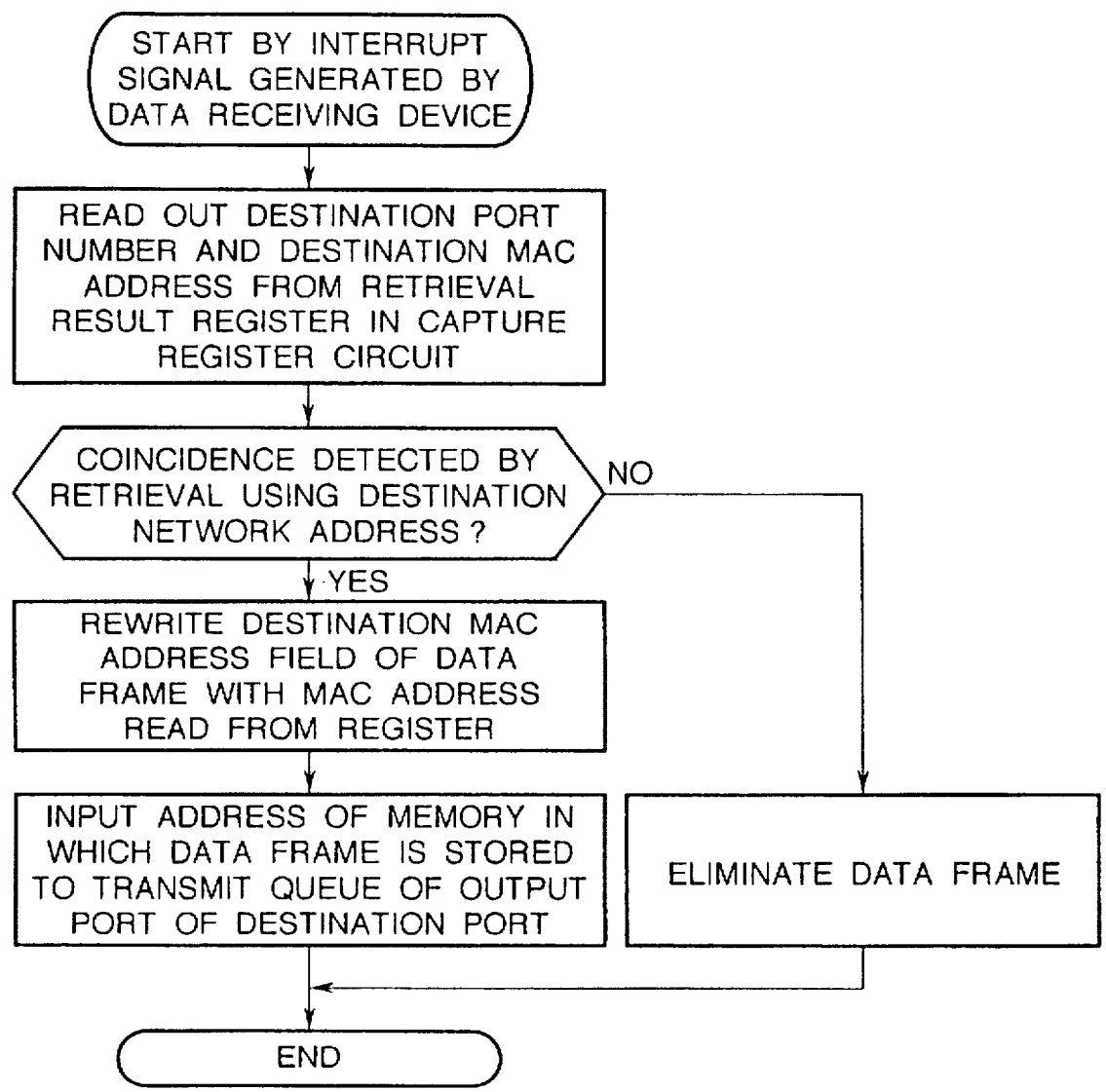
FIG. 29 is a flowchart showing a sequence of the repeating operation when the repeater is a router.

On the other hand, if the repeater is a router, the source/destination network addresses are output to the CAM 108 to carry out the retrieval operation shown in FIG. 11. The repeating control processing device 110 uses any interrupt signal generated by the data receiving device 106 to read out a result of retrieval from the retrieval result register 25C that is provided within the capture register 24. The repeating control processing device 110 rewrites the destination MAC address with the read result of retrieval. Further, when a destination to be relayed is determined by the read result of retrieval, the process for outputting the data frame received in the memory 112 to the corresponding output port 104 is executed to perform the operation for relaying the data frame. FIG. 29 shows the sequence of the repeating operation.

Figure 30:
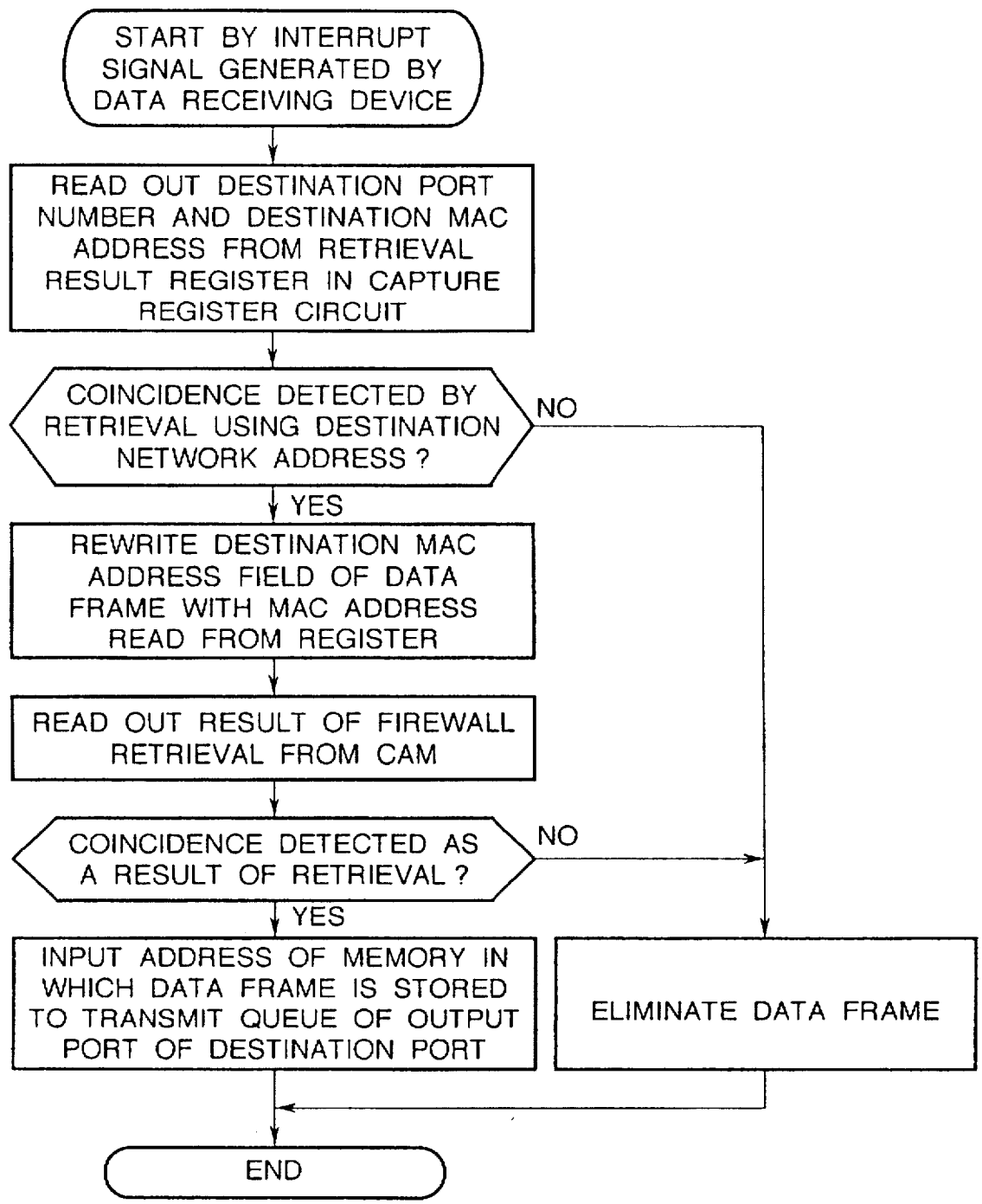
FIG. 30 is a flowchart showing a sequence of the repeating operation when the repeater is a router having a firewall function.

Moreover, if the repeater is a router having a firewall function, the firewall table such as shown in FIG. 6 is consulted to realize the firewall function shown in the lower part in FIG. 11, in addition to the above-mentioned operation. The repeating control processing device 110 reads out a result of the firewall retrieval from the CAM 108 to determine propriety of repeating. If it is determined to disable repeating, the repeating control processing device 110 eliminates the data frame stored in the memory 112. FIG. 30 shows the sequence of the repeating operation.

Although repeating is enabled when coincidence is detected by the firewall retrieval in this embodiment, repeating may be determined to be disabled when coincidence is detected by the fire wall retrieval.

The present invention has been described in conjunction with the embodiments, but the invention is not restricted to these embodiments and it is understood that various modifications are possible within the true scope of the invention.

What is claimed is:

1. A data receiving device for receiving from a network data frame based on any arbitrary protocol in a plurality of protocol hierarchies which are defined from a physical layer to upper layers, comprising:

an input data control circuit for receiving the frame data from the network together with its synchronizing signal and storing them in a register;

a capture register circuit for storing/holding in accordance with information such as a protocol type code, a header length, a frame length, source/destination addresses or source/destination port numbers or socket numbers included in a header for each protocol hierarchy constituting the frame data;

a protocol recognition circuit for identifying a protocol type of each protocol hierarchy from a protocol type code stored in the capture register circuit;

a sequence selection circuit for generating a sequence selection signal used to select a process for each protocol hierarchy of the received frame data in accordance with a result of identification by the protocol recognition circuit and for changing over the sequence selection signal in accordance with a header end signal;

a sequence counter for counting pulse signals of the frame data synchronizing signal;

a sequencer having a function to operate in accordance with a value of the sequence counter and the sequence selection signal, direct to the capture register circuit a timing for storing/holding the information included in the header for each protocol hierarchy and output a second header end timing for directing an end timing for the header when a protocol which is directed by the sequence selection signal and is currently processed has a header having a fixed length; and a header end timing detection circuit which selects either the first header end timing obtained by comparing a value of the sequence counter with a header length of the currently-received protocol hierarchy or the second header end timing output by the sequencer to generate the header end signal.

2. A data receiving device as set forth in claim 1, wherein the input data control circuit includes a plurality of registers that are connected like a shift register and operate as a pipeline and has a function for inputting the frame data to a first step of the registers using its synchronizing signal and outputting the content of each register to the capture register circuit.

3. A data receiving device as set forth in claim 1, further comprising a frame end detection circuit which counts pulse signals of the frame data synchronizing signal after initialized by a frame counter initialization signal output from the sequencer and generates a signal indicating the end timing for the frame data that is being received by comparing the count value with the frame length.

4. A data receiving device as set forth in claim 3, further comprising an interrupt generation circuit that generates an interrupt signal to an external circuit when the header end signal generated by a header end timing generation circuit or the frame end signal generated by a frame end detection circuit.

5. A data receiving device as set forth in claim 1, wherein the input data control circuit includes a first cut-through circuit for outputting the frame data synchronizing signal to outside in accordance with a direction of a first cut-through signal output from the sequencer and for outputting the content of a specific register within the input data control circuit to outside in synchronism with the frame data synchronizing signal.

6. A data receiving device as set forth in claim 1, wherein the capture register circuit includes a second cut-through circuit for outputting the content of a specific register in the capture register to outside together with a synchronizing signal relative thereto in accordance with a direction of a second cut-through signal output from the sequencer.

7. A data receiving device as set forth in claim 5, further comprising a cut-through selection circuit for selecting either a signal output from the first cut-through circuit or a signal output from the second cutthrough circuit and outputting the selected signal.

8. A data receiving device as set forth in claim 1, wherein the input data control circuit has a configuration to take out a destination address from the header of the protocol hierarchy of the received data and transmit the obtained address to an external circuit.

9. A data receiving device as set forth in claim 1, wherein information stored/held in the capture register circuit can be read out to an external circuit.

10. A data receiving device as set forth in claim 1, wherein a protocol of each protocol hierarchy identified by the protocol recognition circuit can. be read out to an external circuit.

11. A data receiving device as set forth in claim 1, wherein the input data control circuit has a function for verifying a checksum with respect to the received data frame and a function for transmitting a result of verification to an external circuit; and wherein the sequencer has a function for directing a timing for starting the checksum operation and a timing for comparing results of the checksum operation to the input data control circuit.

* * * * *